United States Patent
Decamp et al.

(10) Patent No.: US 11,360,534 B2
(45) Date of Patent: Jun. 14, 2022

(54) SMART WORKSPACE MANAGEMENT SYSTEM

(71) Applicant: TARGUS INTERNATIONAL LLC, Anaheim, CA (US)

(72) Inventors: Ronald Decamp, Long Beach, CA (US); Man Cheung Dan Tsang, Carlsbad, CA (US); Nicholas Anthony Markovsky, Yorba Linda, CA (US)

(73) Assignee: TARGUS INTERNATONAL LLC, Anaheim, CA (US)

( * ) Notice: Subject to any disclaimer, the term of this patent is extended or adjusted under 35 U.S.C. 154(b) by 279 days.

(21) Appl. No.: 16/446,440

(22) Filed: Jun. 19, 2019

(65) Prior Publication Data

US 2020/0218324 A1 Jul. 9, 2020

Related U.S. Application Data

(63) Continuation-in-part of application No. 16/240,124, filed on Jan. 4, 2019, now Pat. No. 11,017,334.

(51) Int. Cl.
*G06F 1/00* (2006.01)
*G06F 11/30* (2006.01)
(Continued)

(52) U.S. Cl.
CPC .............. *G06F 1/28* (2013.01); *G06F 1/1632* (2013.01); *G06F 1/266* (2013.01); *G06F 1/3231* (2013.01); *G06F 11/34* (2013.01)

(58) Field of Classification Search
CPC ...... G06F 1/1632; G06F 1/28; G06F 11/3006; G06F 11/3062; G06F 11/32; G06F 11/34;
(Continued)

(56) References Cited

U.S. PATENT DOCUMENTS 5,627,974 A 5/1997 Watts, Jr. et al.
5,692,400 A 12/1997 Bliven et al.
(Continued)

FOREIGN PATENT DOCUMENTS

AU 2014100171 3/2014
CN 101893916 11/2010
(Continued)

OTHER PUBLICATIONS

U.S. Appl. No. 16/029,339, Non-Final Office Action, dated Aug. 8, 2019, 14 pages.
(Continued)

*Primary Examiner* — Zhipeng Wang
(74) *Attorney, Agent, or Firm* — Stoel Rives LLP

(57) ABSTRACT

Systems for managing a workspace are disclosed. A system to manage a workspace includes a plurality of docking stations located at corresponding workstations. Each docking station is configured to provide a network connection and power to a computer device at a corresponding workstation. Each docking station of the plurality of docking stations includes a power input and a network interface to communicate with a network. The system also includes a system computer including a system network interface to communicate with each docking station of the plurality of docking stations via the network.

16 Claims, 13 Drawing Sheets

(51) Int. Cl.
*G06F 1/28* (2006.01)
*G06F 1/16* (2006.01)
*G06F 1/26* (2006.01)
*G06F 11/34* (2006.01)
*G06F 1/3231* (2019.01)

(58) Field of Classification Search
CPC ...... G06F 11/3438; G06F 1/263; G06F 1/266; G06F 1/3209; G06F 1/3231; G06F 1/3287; G06F 1/329; G06F 3/0482; G06F 3/04847; Y02D 10/00
See application file for complete search history.

(56) References Cited

U.S. PATENT DOCUMENTS

| | | |
|---|---|---|
| 5,835,733 A | 11/1998 | Walsh et al. |
| 5,864,708 A | 1/1999 | Croft et al. |
| 5,886,424 A | 3/1999 | Kim |
| 6,029,215 A | 2/2000 | Watts, Jr. et al. |
| 6,170,026 B1 | 1/2001 | Kimura et al. |
| 6,604,199 B1 | 8/2003 | Yang et al. |
| 6,629,182 B1 | 9/2003 | Mizoguchi et al. |
| 6,665,805 B1 | 12/2003 | Tsirkel et al. |
| 6,804,740 B1 | 10/2004 | Watts et al. |
| 6,888,338 B1 | 5/2005 | Popescu-Stanesti et al. |
| 6,956,474 B2 | 10/2005 | Jakubowski |
| 6,976,885 B2 | 12/2005 | Lord |
| 7,035,100 B2 | 4/2006 | Charles |
| 7,035,126 B1 | 4/2006 | Lanni |
| 7,099,152 B2 | 8/2006 | Gasbarro |
| 7,103,760 B1 | 9/2006 | Billington et al. |
| 7,171,461 B2 | 1/2007 | Ewing et al. |
| 7,201,611 B2 | 4/2007 | Faranda |
| 7,225,227 B2 | 5/2007 | Omura et al. |
| 7,281,698 B2 | 10/2007 | Patterson, Jr. |
| 7,403,232 B1 | 7/2008 | Orlicki et al. |
| 7,471,511 B2 | 12/2008 | Montag et al. |
| 7,643,283 B2 | 1/2010 | Jubelirer et al. |
| 7,681,134 B1 | 3/2010 | Grechishkin et al. |
| 7,683,573 B2 | 3/2010 | Nikazm et al. |
| 7,899,970 B2 | 3/2011 | Mori |
| 7,926,430 B2 | 4/2011 | Bakker |
| 7,976,337 B1 | 7/2011 | Cortopassi et al. |
| 8,074,581 B2 | 12/2011 | Epstein et al. |
| 8,312,199 B2 | 11/2012 | Johnson |
| 8,323,040 B2 | 12/2012 | Prest |
| 8,346,753 B2 | 1/2013 | Hayes |
| 8,359,356 B2 | 1/2013 | Belz et al. |
| 8,395,605 B2 | 3/2013 | Sisto et al. |
| 8,508,573 B2 | 8/2013 | Grimshaw |
| 8,611,076 B2 | 12/2013 | Wetzel et al. |
| 8,797,159 B2 * | 8/2014 | Kirkpatrick .......... G08B 13/189 340/541 |
| 8,799,537 B1 | 8/2014 | Zhu et al. |
| 8,879,250 B2 | 11/2014 | Franz |
| 8,884,896 B2 | 11/2014 | Tabone et al. |
| 8,896,656 B2 | 11/2014 | Epstein et al. |
| 8,909,842 B2 | 12/2014 | Johnson |
| 8,990,469 B2 | 3/2015 | Benhard et al. |
| 9,152,177 B2 | 10/2015 | Feldstein |
| 9,189,751 B2 * | 11/2015 | Matsuoka .......... G05D 23/1902 |
| 9,224,290 B1 | 12/2015 | Mason et al. |
| 9,249,927 B2 | 2/2016 | Graham |
| 9,274,994 B2 | 3/2016 | Capezza |
| 9,304,545 B2 | 4/2016 | Ramirez et al. |
| 9,338,268 B2 | 5/2016 | Holtman |
| 9,377,814 B2 | 6/2016 | Ramirez et al. |
| 9,392,427 B2 | 7/2016 | Goldman |
| 9,411,551 B2 | 8/2016 | Haren |
| 9,456,686 B2 | 10/2016 | Epstein |
| 9,531,651 B1 | 12/2016 | Cherubini |
| 9,612,628 B2 | 4/2017 | Halim et al. |
| 9,647,481 B2 | 5/2017 | Huang et al. |
| 9,696,777 B2 | 7/2017 | Pamley et al. |
| 9,723,358 B1 | 8/2017 | Chan |
| 9,736,427 B1 | 8/2017 | Grimshaw et al. |
| 9,760,116 B2 | 9/2017 | Wylie |
| 9,778,779 B2 | 10/2017 | Chartier et al. |
| 9,794,496 B2 | 10/2017 | Soffer et al. |
| 9,829,333 B1 | 11/2017 | Calder |
| 9,838,475 B2 | 12/2017 | Brown et al. |
| 9,961,306 B1 | 5/2018 | Lev et al. |
| 10,001,807 B2 | 6/2018 | Chung et al. |
| 10,108,221 B1 | 10/2018 | Jin et al. |
| 10,354,531 B1 * | 7/2019 | Bronder ................ G08G 1/144 |
| 10,452,096 B1 | 10/2019 | Keilers et al. |
| 10,462,611 B1 | 10/2019 | Klinkner et al. |
| 10,623,701 B1 | 4/2020 | Bracewell et al. |
| 11,017,334 B2 | 5/2021 | Decamp et al. |
| 2002/0080132 A1 | 6/2002 | Dai et al. |
| 2002/0119800 A1 | 8/2002 | Jaggers et al. |
| 2003/0084222 A1 | 5/2003 | Wurzburg |
| 2003/0107566 A1 | 6/2003 | Shin et al. |
| 2003/0154293 A1 | 8/2003 | Zmolek et al. |
| 2003/0182150 A1 | 9/2003 | Reddy |
| 2003/0217098 A1 | 11/2003 | Bobde et al. |
| 2003/0217142 A1 | 11/2003 | Bobde et al. |
| 2003/0222149 A1 | 12/2003 | Solomon et al. |
| 2004/0064621 A1 | 4/2004 | Dougherty et al. |
| 2004/0088465 A1 | 5/2004 | Bianchi |
| 2004/0095713 A1 | 5/2004 | Chuang |
| 2004/0111382 A1 | 6/2004 | Haji-Ioannou |
| 2004/0116149 A1 | 6/2004 | Yukie et al. |
| 2004/0125777 A1 | 7/2004 | Doyle et al. |
| 2004/0212586 A1 | 10/2004 | Denny |
| 2004/0268163 A1 | 12/2004 | Yeh |
| 2005/0033481 A1 | 2/2005 | Budhraja et al. |
| 2005/0036283 A1 | 2/2005 | Hillman et al. |
| 2005/0057893 A1 | 3/2005 | Homer et al. |
| 2005/0114503 A1 | 5/2005 | Ruetschi et al. |
| 2005/0162824 A1 | 7/2005 | Thompson |
| 2005/0164545 A1 | 7/2005 | Rosenthal et al. |
| 2005/0180086 A1 | 8/2005 | Schaefer et al. |
| 2005/0245115 A1 | 11/2005 | Bell et al. |
| 2005/0246421 A1 | 11/2005 | Moore |
| 2006/0005055 A1 | 1/2006 | Potega |
| 2006/0061958 A1 | 3/2006 | Solomon et al. |
| 2006/0075286 A1 | 4/2006 | Hodge et al. |
| 2006/0095641 A1 | 5/2006 | Pandit et al. |
| 2006/0103504 A1 | 5/2006 | Vassallo |
| 2006/0112375 A1 | 5/2006 | Schneider |
| 2006/0123807 A1 | 6/2006 | Sullivan et al. |
| 2006/0161713 A1 | 7/2006 | Belady |
| 2006/0205381 A1 | 9/2006 | Beart et al. |
| 2006/0250764 A1 | 11/2006 | Howarth et al. |
| 2006/0250765 A1 | 11/2006 | Howarth et al. |
| 2006/0250767 A1 | 11/2006 | Brophy et al. |
| 2007/0030276 A1 | 2/2007 | MacInnis et al. |
| 2007/0033289 A1 | 2/2007 | Nuyttens et al. |
| 2007/0054550 A1 | 3/2007 | Cuthbert et al. |
| 2007/0058332 A1 | 3/2007 | Canterbury et al. |
| 2007/0065078 A1 | 3/2007 | Jiang |
| 2007/0070598 A1 | 3/2007 | Chuang |
| 2007/0074284 A1 | 3/2007 | Woog |
| 2007/0097618 A1 | 5/2007 | Searby et al. |
| 2007/0101039 A1 | 5/2007 | Rutledge et al. |
| 2007/0120874 A1 | 5/2007 | MacInnis et al. |
| 2007/0130323 A1 | 6/2007 | Landsman et al. |
| 2007/0168593 A1 | 7/2007 | Montag et al. |
| 2008/0036780 A1 | 2/2008 | Liang et al. |
| 2008/0053770 A1 | 3/2008 | Tynyk |
| 2008/0119241 A1 | 5/2008 | Dorogusker et al. |
| 2008/0126594 A1 | 5/2008 | Monks et al. |
| 2008/0194119 A1 | 8/2008 | Mori |
| 2008/0239681 A1 | 10/2008 | Iida |
| 2008/0244026 A1 | 10/2008 | Holt et al. |
| 2008/0313108 A1 | 12/2008 | Carrabis |
| 2009/0058359 A1 | 3/2009 | Fischer et al. |
| 2009/0066704 A1 | 3/2009 | Daniel et al. |
| 2009/0072782 A1 | 3/2009 | Randall |
| 2009/0079264 A1 | 3/2009 | Minami |
| 2009/0079416 A1 | 3/2009 | Vinden et al. |
| 2009/0125743 A1 | 5/2009 | Robertson et al. |

(56) References Cited

U.S. PATENT DOCUMENTS

| | | |
|---|---|---|
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0309748 A1 | 12/2009 | Elgort et al. |
| 2010/0037283 A1 | 2/2010 | Zhu |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2011/0001486 A1 | 1/2011 | Abouda et al. |
| 2011/0035443 A1 | 2/2011 | Jensen |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0034951 A1 | 2/2012 | Jones et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0203949 A1 | 8/2012 | Benhard et al. |
| 2012/0229076 A1 | 9/2012 | Zhu et al. |
| 2012/0275526 A1 | 11/2012 | Hughes |
| 2012/0278640 A1* | 11/2012 | Caglianone ............ G06F 1/3231 713/323 |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1 | 2/2013 | Holsman et al. |
| 2013/0057567 A1 | 3/2013 | Frank et al. |
| 2013/0060662 A1 | 3/2013 | Carlson et al. |
| 2013/0106979 A1 | 5/2013 | Chang et al. |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0205060 A1 | 8/2013 | Benhard et al. |
| 2013/0311801 A1 | 11/2013 | Kong et al. |
| 2014/0028462 A1 | 1/2014 | Lawson |
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1 | 6/2014 | Wylie et al. |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0278645 A1 | 9/2014 | Davidson et al. |
| 2014/0301575 A1 | 10/2014 | Holtman et al. |
| 2014/0316584 A1* | 10/2014 | Matsuoka ................ F24F 11/62 700/278 |
| 2014/0342669 A1 | 11/2014 | Zeung et al. |
| 2014/0359318 A1 | 12/2014 | Liu et al. |
| 2014/0365396 A1 | 12/2014 | Kumar et al. |
| 2015/0006026 A1 | 1/2015 | Schaffer et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0046623 A1 | 2/2015 | Ramirez et al. |
| 2015/0081381 A1 | 3/2015 | Okoba |
| 2015/0082061 A1 | 3/2015 | Ramirez et al. |
| 2015/0106814 A1 | 4/2015 | Mlke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0237191 A1 | 8/2015 | Moran et al. |
| 2015/0281627 A1 | 10/2015 | Wang et al. |
| 2015/0295440 A1 | 10/2015 | Liao |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0173678 A1 | 6/2016 | Decamp |
| 2016/0187963 A1 | 6/2016 | Leinonen et al. |
| 2016/0193932 A1 | 7/2016 | Pedram |
| 2016/0195856 A1 | 7/2016 | Spero |
| 2016/0195897 A1 | 7/2016 | Robinson |
| 2016/0285310 A1 | 9/2016 | Tan et al. |
| 2016/0308929 A1 | 10/2016 | Fu |
| 2016/0321333 A1 | 11/2016 | Oka |
| 2017/0024197 A1 | 1/2017 | Pantelka et al. |
| 2017/0054734 A1 | 2/2017 | Sigal et al. |
| 2017/0068913 A1 | 3/2017 | Pignataro et al. |
| 2017/0099361 A1 | 4/2017 | Digilov et al. |
| 2017/0123456 A1 | 5/2017 | Chung et al. |
| 2017/0140235 A1 | 5/2017 | Yu et al. |
| 2017/0255452 A1* | 9/2017 | Barnes .................... H04L 69/18 |
| 2017/0262779 A1* | 9/2017 | Remaker ............ H04L 43/0811 |
| 2017/0325318 A1* | 11/2017 | Wendt .................. H05B 47/115 |
| 2017/0336846 A1 | 11/2017 | Shieh et al. |
| 2017/0345290 A1 | 11/2017 | Law et al. |
| 2017/0374114 A1 | 12/2017 | Feldman |
| 2018/0017992 A1 | 1/2018 | Wylie |
| 2018/0103212 A1 | 4/2018 | Epstein et al. |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0189730 A1 | 7/2018 | Wilkinson et al. |
| 2018/0191113 A1 | 7/2018 | Byrne et al. |
| 2018/0267681 A1 | 9/2018 | Epstein |
| 2018/0324393 A1 | 11/2018 | Ryan et al. |
| 2018/0338368 A1* | 11/2018 | Pfund .................... H05B 45/20 |
| 2019/0005476 A1 | 1/2019 | Luo et al. |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0228348 A1 | 7/2019 | O'Keefe-Sally et al. |
| 2019/0243419 A1 | 8/2019 | Charlesworth et al. |
| 2019/0272141 A1 | 9/2019 | Poel et al. |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0104762 A1 | 4/2020 | Gibson et al. |
| 2020/0201388 A1 | 6/2020 | Spyrison et al. |
| 2020/0219036 A1 | 7/2020 | Decamp et al. |
| 2020/0241597 A1 | 7/2020 | Decamp et al. |
| 2020/0256902 A1 | 8/2020 | Decamp et al. |
| 2020/0326955 A1 | 10/2020 | Adiletta et al. |
| 2021/0051298 A1 | 2/2021 | Atkins et al. |
| 2021/0058584 A1 | 2/2021 | Decamp et al. |
| 2021/0072792 A1 | 3/2021 | Decamp et al. |
| 2021/0073155 A1 | 3/2021 | Decamp et al. |
| 2021/0181794 A1 | 6/2021 | Chung et al. |
| 2021/0191462 A1 | 6/2021 | Decamp et al. |
| 2021/0233010 A1 | 7/2021 | Decamp et al. |
| 2021/0258538 A1 | 8/2021 | Decamp, II et al. |

(56) References Cited

U.S. PATENT DOCUMENTS

FOREIGN PATENT DOCUMENTS

| | | |
|---|---|---|
| CN | 104094187 | 10/2014 |
| CN | 104838558 | 8/2015 |
| CN | 105593782 | 5/2016 |
| CN | 106707834 | 5/2017 |
| CN | 107274660 A | 10/2017 |
| CN | 107702282 A | 2/2018 |
| DE | 102013104216 | 11/2013 |
| EP | 1085400 | 3/2001 |
| EP | 2722728 | 4/2014 |
| EP | 2823372 | 1/2015 |
| EP | 2929613 | 10/2015 |
| EP | 3030948 | 6/2016 |
| EP | 3087476 | 11/2016 |
| GB | 2457252 | 8/2009 |
| GB | 2513197 | 10/2014 |
| IN | 201617004084 | 12/2015 |
| IN | 201406041 | 1/2016 |
| JP | 2013239178 | 11/2013 |
| JP | 6110878 | 5/2015 |
| JP | 2016504900 | 2/2016 |
| KR | 1020090069890 A | 7/2009 |
| KR | 1020140069684 | 6/2014 |
| KR | 101452319 | 10/2014 |
| KR | 20150091362 | 8/2015 |
| KR | 1020150130842 | 11/2015 |
| KR | 2020100000082 | 1/2020 |
| RU | 2630376 | 7/2017 |
| TW | I387182 B1 | 2/2013 |
| TW | 201347581 | 11/2013 |
| WO | 03030304 | 4/2003 |
| WO | 2005003983 | 1/2005 |
| WO | 2008109193 | 9/2008 |
| WO | 2011138581 | 11/2011 |
| WO | 2013024855 | 2/2013 |
| WO | 2013033573 | 3/2013 |
| WO | 2016011566 | 1/2016 |
| WO | 2017140474 | 8/2017 |
| WO | 20018216004 A1 | 11/2018 |
| WO | 2019018007 | 1/2019 |
| WO | 2020142525 A1 | 7/2020 |
| WO | 2021035156 A1 | 2/2021 |
| WO | 2021050215 A1 | 3/2021 |
| WO | 2021050575 A1 | 3/2021 |

OTHER PUBLICATIONS

U.S. Appl. No. 16/029,339, Notice of Allowance, dated Dec. 4, 2019, 10 pages.
U.S. Appl. No. 15/655,699, Advisory Action, dated Aug. 1, 2019, 4 pages.
U.S. Appl. No. 15/655,699, Notice of Allowance, dated Mar. 6, 2020, 7 pages.
PCT/US2020/049980, International Search Report and Written Opinion, dated Nov. 27, 2020, 15 pages.
U.S. Appl. No. 15/655,699, Non-Final Office Action, dated Sep. 6, 2019, 18 pages.
U.S. Appl. No. 13/365,754, Final Office Action, dated Dec. 27, 2013, 18 pgs.
U.S. Appl. No. 13/365,754, Notice of Allowance, dated Feb. 4, 2015, 8 pgs.
U.S. Appl. No. 13/365,754, Final Office Action, dated Jun. 10, 2014, 22 pgs.
U.S. Appl. No. 13/365,754, Non-Final Office Action, dated May 13, 2014, 18 pgs.
U.S. Appl. No. 13/365,754, Non-Final Office Action, dated Sep. 10, 2013, 15 pgs.
U.S. Appl. No. 13/365,754, Non-Final Office Action, dated Sep. 17, 2014, 25 pgs.
U.S. Appl. No. 13/786,038, Non-Final Office Action, dated Sep. 18, 2014, 24 pgs.
U.S. Appl. No. 14/634,196, Non-Final Office Action, dated Sep. 7, 2016, 25 pgs.
U.S. Appl. No. 14/923,833, Final Office Action, dated Aug. 9, 2017, 22 pgs.
U.S. Appl. No. 14/923,833, Notice of Allowance, dated Dec. 18, 2017, 5 pgs.
U.S. Appl. No. 14/923,833, Non-Final Office Action, dated Mar. 2, 2017, 22 pgs.
U.S. Appl. No. 14/923,833, Non-Final Office Action, dated Nov. 1, 2016, 14 pgs.
U.S. Appl. No. 14/970,318, Notice of Allowance, dated Dec. 6, 2017, 11 pgs.
U.S. Appl. No. 14/970,318, Non-Final Office Action, dated Feb. 6, 2017, 21 pgs.
U.S. Appl. No. 14/970,318, Non-Final Office Action, dated Jul. 11, 2017, 15 pgs.
U.S. Appl. No. 14/970,318, Non-Final Office Action, dated Oct. 14, 2016, 13 pgs.
U.S. Appl. No. 14/970,318, Advisory Action, dated Sep. 28, 2017, 3 pgs.
U.S. Appl. No. 15/261,204, Non-Final Office Action, dated Apr. 30, 2018, 20 pgs.
U.S. Appl. No. 15/261,204, Advisory Action, dated Feb. 1, 2019, 7 pages.
U.S. Appl. No. 15/261,204, Non-Final Office Action, dated Jun. 27, 2019, 20 pages.
U.S. Appl. No. 15/261,204, Final Office Action, dated Nov. 2, 2018, 22 pgs.
U.S. Appl. No. 15/655,669, Final Office Action, dated May 16, 2019, 16 pages.
U.S. Appl. No. 15/655,699, Non-Final Office Action, dated Nov. 19, 2018, 37 pgs.
U.S. Appl. No. 15/905,241, Non-Final Office Action, dated Nov. 2, 2018, 34 pgs.
U.S. Appl. No. 16/029,339, Final Office Action, dated Apr. 19, 2019, 14 pages.
U.S. Appl. No. 16/029,339, Non-Final Office Action, dated Nov. 2, 2018, 28 pgs.
Dong, "Web-based Building Energy Consumption Monitoring and Conservation Service", 4th International Conference on Mechatronics, Materials, Chemistry and Computer Engineering (ICMMCCE 2015), pp. 3036-3040.
Fink, "Toshiba Dynadock V Review", Laptop Magazine, retrieved from the Internet on Dec. 21, 2013, at <http://www.laptopmag.com/review/accessories/Toshiba-dynadock-v.aspx>, Aug. 9, 2010, pp. 1-2.
Ganesh, "Visible Engergy UFO Power Center Smart Power Strip Review", AnandTech, http://www.anandtech.com/show/6413/visible-energy-ufo-power-center-smart-power-stripreview, Oct. 26, 2012.
PCT/US2012/023717, International Preliminary Reporton Patentability, dated Aug. 15, 2013, 6 pgs.
PCT/US2012/023717, International Search Report and Written Opinion, dated Aug. 30, 2012, 9 pgs.
PCT/US2014/017434, International Search Report and Written Opinion, dated Jun. 30, 2014, 8 pgs.
PCT/US2014/017434, International Preliminary Reporton Patentability, dated Sep. 17, 2015, 10 pgs.
PCT/US2015/065730, International Preliminary Reporton Patentability, dated Apr. 6, 2016, 13 pgs.
PCT/US2015/065730, International Search Report and Written Opinion, dated Apr. 6, 2016, 16 pgs.
PCT/US2017/048367, International Search Report and Written Opinion, dated Oct. 27, 2017, 15 pgs.
PCT/US2018/017232, International Search Report and Written Opinion, dated May 21, 2018, 13 pgs.
U.S. Appl. No. 15/261,204, Notice of Allowance, dated Feb. 4, 2020, 8 pages.
U.S. Appl. No. 15/655,699, Final Office Action, dated Feb. 7, 2020, 8 pages.
U.S. Appl. No. 16/240,124, Non-Final Office Action, dated Nov. 13, 2020, 30 pages.

(56) References Cited

OTHER PUBLICATIONS

Agnihotri, Mohit, et al., "Topology Formation in Mesh Networks Considering Role Suitability", Workshop on Device Communications for 5G Networks, WD5G, 2016, 7 pages.
Dell, "Dell Docking Station WD15 User Guide", 2015, 31 pages.
U.S. Appl. No. 16/999,778, et al., Notice of Allowance, dated Mar. 19, 2021, 13 pages.
U.S. Appl. No. 16/999,778, et al., Non-Final Office Action, dated Nov. 13, 2020, 16 pages.
PCT/US2020/046703, International Search Report and Written Opinion, dated Jan. 13, 2021, 12 pages.
U.S. Appl. No. 16/849,858, Notice of Allowance, dated Jan. 22, 2021. 8 pages.
U.S. Appl. No. 16/849,858, Non-Final Office Action, dated Jun. 26, 2020, 12 pages.
U.S. Appl. No. 16/240,124, Notice of Allowance, dated Feb. 22, 2021, 9 pages.
PCT/US2019/069120, International Search Report and Written Opinion, dated Apr. 29, 2020, 11 pages.
Wikipedia, "USB", https://web.archive.org/web/20141024053934/https://en.wikipedia.org/wiki/USB, Oct. 24, 2014, 42 pages.
PCT/US2020/047448, et al., International Search Report and Written Opinion, dated Nov. 20, 2020, 13 pages.
U.S. Appl. No. 16/721,403, Non-Final Office Action, dated Feb. 1, 2022, 17 pages.
U.S. Appl. No. 16/849,799, Notice of Allowance, dated Oct. 8, 2021, 5 pages.
U.S. Appl. No. 17/308,351, Non-Final Office Action, dated Nov. 15, 2021, 14 pages.
U.S. Appl. No. 17/229,547, Non-Final Office Action, dated Feb. 15, 2022, 24 pages.
U.S. Appl. No. 17/308,351, Notice of Allowance, dated Mar. 29, 2022, 5 pages.
U.S. Appl. No. 16/833,089, Non-Final Office Action, dated Apr. 8, 2022, 23 pages.

* cited by examiner

SMART WORKSPACE MANAGEMENT SYSTEM

BACKGROUND

The Internet of Things (IoT) and big data are allowing enterprises to analyze, understand, manage, and act upon data insights in ways never before imagined.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
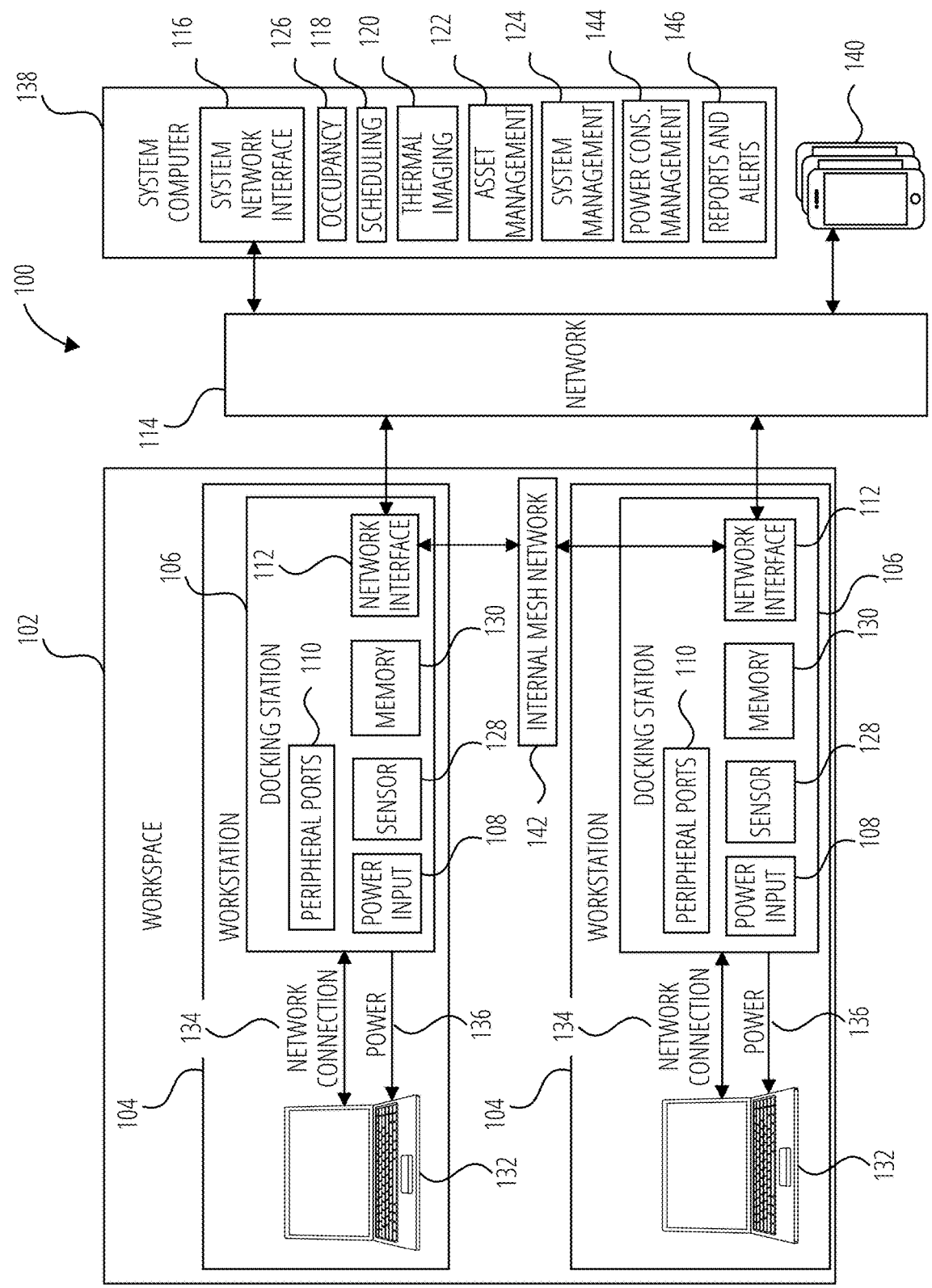
FIG. 1 is a block diagram of a system to manage a workspace, according to some embodiments.

Embodiments disclosed herein are directed to capturing, analyzing, and deriving actionable value from data collected at the workspace level. These embodiments provide a system and methods for accurately understanding how workstations are performing. Docking stations located at these workstations may include processors, and may be connected via a communications network to a system computer. The ability to communicate with the docking stations at the workstations enables the system computer to perform various valuable operations. For example, real estate costs are likely a top two operational expense for a business. Embodiments disclosed herein enable monitoring of how assets at a workspace (e.g., desks, workstations, etc.) are being used (e.g., which assets are being used most) and determining why or why not the assets are being used. By way of specific, non-limiting example, embodiments disclosed herein enable determining whether a workspace including 2,000 (e.g., each including a desk) workstations is being effectively used, or if a smaller, cheaper workspace including only 1,400 workstations would be sufficient. Downscaling to a smaller number of workstations could reduce costs significantly by reducing the amount of money spent on real estate, furnishings for the workspace, and power consumption.

Another cost for a business is power expenditure cost. Embodiments disclosed herein enable monitoring of how much power is consumed in a workspace at the workstation level, and how that power is being consumed. By way of non-limiting example, workstations that are staying powered when not in use (e.g., in the overnight hours, on holidays, etc.) may be identified, and remedial action may be taken. In addition to saving on energy expenditure costs, this monitoring may give a business the information needed to comply with power consumption standards, such as those governed by Leadership in Energy and Environmental Design (LEED), if desired.

Embodiments disclosed herein further enable Information Technology (IT) personnel to perform remote diagnostics and management of workstations. By way of non-limiting examples, embodiments disclosed herein provide for remote dock power cycle and/or reset, and remote dock firmware updates. Also by way of non-limiting example, embodiments disclosed herein may enable a user to create multiple different workstation configurations. Examples of these workstation configurations may include a first configuration for two displays, a mouse, and a keyboard, and a second configuration with one display, a mouse, and a keyboard. These configurations may be applied to any workstation within a workspace that is connected to the system computer. As another non-limiting example, embodiments disclosed herein may provide a visual indication that specific workstation satisfies/matches minimum specifications for a given workstation configuration. For example, if a workstation is configured as a "two display" workstation and the system detects all specified hardware (e.g., dual displays, mouse, and keyboard), the workstation may receive an indicator (e.g., a color-coded indicator such as a green indicator) on a user interface. As a further, non-limiting example, embodiments disclosed herein may provide a visual indication that a specific workstation fails or does not match the minimum specifications of a given workstation configuration. For example, if a workstation is configured as a "two-display" workstation and the system does not detect all specified hardware (e.g., dual displays, mouse, and keyboard), the workstation may receive an indicator (e.g., a color-coded indicator such as a red indicator) on a user interface.

Since the system computer communicates with the docking stations at the workstations, the system computer may automate asset management. For example, the system computer may automatically log and inventory peripherals (e.g., displays, accessories, Hard Disc Drives (HDDs), etc.) connected to the docking stations (whether hard-wired or connected wirelessly). For example, the system computer may be configured to automatically discover all electronic assets in the system. Also, the system computer may be configured to automatically inventory all electronic assets and provide unique identifications for each electronic asset (e.g., as supplied via an operating system). The system computer may further enable a user to enter search criteria for an asset and have the system return matches that match the search criteria entered by the user (e.g., returned values should be total quantity matches such as, for example "Dell display=system returns numeric value). In another example, the system computer may be configured to conserve power by dynamically controlling one or more devices (e.g., smart lights, smart thermostats, and so forth) based at least partially on generated sensor data received at the system computer. As another example, the system computer may be configured to generate reports that identify inventoried electronic devices. In some embodiments, the system computer may be configured to export a current connected electronic asset inventory to a file (e.g., a comma separated values (CSV) file, other similar format, etc.). In some embodiments, the system computer may be configured to provide a text field to enter asset-specific notes that will stay tied to that same asset if it is unplugged and moved elsewhere (e.g., from one workstation to another workstation). Examples of text that may be tied to an asset include install date, cost, department of ownership, etc. The system computer may enable the user to search (e.g., text search) the text field for any detected asset. In some embodiments, the system computer may be configured to run a report that will list all assets that were connected previously but are not connected now (e.g., to discover missing assets, etc.).

In addition, the system computer may monitor health of peripheral devices (e.g., displays and other accessories) and perform diagnostics on these peripheral devices. This monitoring may include real-time workstation status tracking, determining whether workstations are not being used due to equipment issues or are malfunctioning, determining whether ports of the docking stations are functioning correctly, providing alerts, warnings, notifications, etc., and monitoring workspace ambient conditions such as temperature, humidity, internal temperature of devices, etc.

The embodiments disclosed herein may benefit docking station users, IT management and IT support personnel, facilities and space planners, and real estate and change management. For IT management and support personnel, the embodiments disclosed herein enable remote docking station reset (e.g., from the next room or from a continent away), remote docking station firmware updates, remote diagnostics (e.g., workstation health diagnostics), connected peripheral identification, and remote Alternating Current (AC) power on/off control and power event scheduling. For facilities and space planners and real estate and change management, workstation utilization may be reviewed. These beneficiaries may analyze data (e.g., power consumption data, workspace usage data, etc.) at a global level, a region level (e.g., the region including multiple offices or office buildings), an office level (e.g., a single building or campus including multiple buildings within a region), a floor level (e.g., a floor within an office), a zone level (e.g., a zone within a floor), a department level (e.g., an IT department, an engineering department, a human resources department, etc.), a desk level, etc. Dashboards or graphical user interfaces (UIs) for Web browser and/or mobile device software applications may be provided, including UIs with heat-maps to illustrate power consumption within a workspace.

FIG. 1 is a block diagram of a system 100 to manage a workspace 102, according to some embodiments. The workspace 102 includes a plurality of workstations 104, each including a docking station 106. It should be understood that the workspace 102 may span a global level, an office level, a floor level, a zone level, or a department level, etc. FIG. 1 illustrates only two workstations 104 to avoid complexity of FIG. 1, but it should be understood that the plurality of workstations 104 may include two or more workstations 104 up to any number of workstations 104 (e.g., hundreds or thousands of workstations). Each docking station 106 is configured to provide a network connection 134 and power 136 to a computer device 132 at the corresponding one of the workstations 104. Each docking station 106 includes a power input 108, the memory 130, and a network interface 112 to communicate with a network 114. While illustrated in FIG. 1 as being located inside of the docking station 112, the memory 130 may be located inside or outside the docking station 106 and may be connected to the docking station 106 via a wired or wireless connection. The network interface 112 may also be configured to enable each docking station 106 to communicate with other docking stations 106 in the workspace 102 in an internal mesh network 142 (e.g., via Bluetooth low energy (BLE) technology or other mesh networking technologies).

The system 100 also includes a system computer 138 including a system network interface 116 to enable the system computer 138 to communicate, through the network 114, with each docking station 106 at each of the plurality of workstations 104. The system computer 138 may include one or more computer devices located on-site at the workspace 102, off-site, in a cloud network (e.g., the cloud with analytics/in house server 214 of FIG. 2), in an in-house network (e.g., the in-house IT network 218 of FIG. 2), or combinations thereof. The system network interface 116 of the system computer 138 and the network interface 112 of each docking station 106 enables the system computer 138 to manage the workspace 102 in a variety of ways. For example, the system computer 138 may be capable of:

managing and monitoring consumption of power at the workstations 104 (e.g., capturing and analyzing individual device power consumption at the workstations 104, understand and optimize power consumption at the workstations 104, schedule power on/off events, etc.)

managing workspace occupancy and scheduling (e.g., provide workspace utilization data, schedule Hotdesking environments where users are not permanently assigned to particular workstations 104, understand how a flexible workspace is working, maximize available space, reduce real estate costs, etc.).

managing access and/or security of workstations through authentication tools such as radio frequency identification (RFID) (e.g., near field communication, or "NFC").

managing assets (e.g., automatic identification and inventorying of peripheral devices connected to docking stations 106, etc.)

managing and actuating devices remotely (e.g., enable IT professionals to remotely manage the workspace 102, perform soft resets, power cycle, and firmware updates remotely, etc.)

securing workspace and finding employees (e.g., identify and locate employees based on their scheduled workstations 104, provide enhanced network security, understand which of the workstations 104 employees are located in, enable employees to find each other, and enable employees to work more efficiently and securely, etc.)

generating a management dashboard with visual heat-mapping (e.g., a graphical user dashboard visualizes complex data using heat-mapping and easy-to-understand charting to show real-time or historic snapshots, quickly understand high-level overview of workspaces or drill down into the detail with device-level granularity, etc.)

conserving power by dynamically controlling devices (e.g., docking stations, monitors, smart lighting, smart thermostats, etc.) in response to received sensor data (e.g., light sensors, temperature sensors, etc.)

To enable these functions, and other functions disclosed herein, of the system computer 138, the system computer 138 may include computer code configured to instruct the system computer 138 to perform these functions. By way of non-limiting example, the computer code may be organized into computer code for occupancy 126, scheduling 118, thermal imaging 120, asset management 122, system management 124, power conservation management 144, and reports and alerts 146. It will be appreciated by those skilled in the art that other organizations of the computer code other than the example presented in FIG. 1 may be used without departing from the scope of the disclosure. The following discussion will provide more detail regarding the functions the system computer 138 is configured to perform.

Desk Power Consumption and Monitoring

Figure 2:
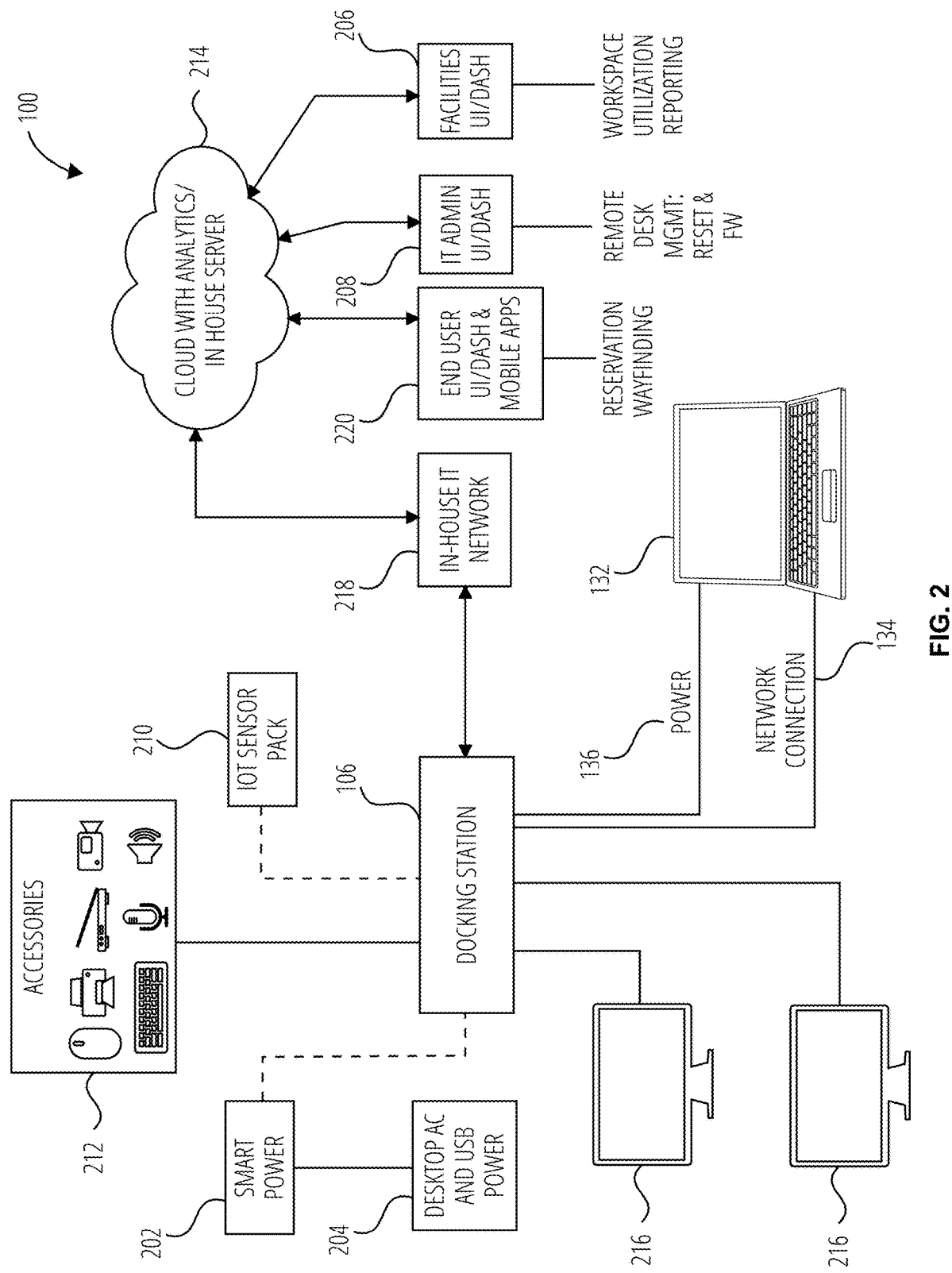
FIG. 2 is a block diagram of an example of a portion of the system of FIG. 1, according to some embodiments.

The docking station 106 of each of the workstations 104 may include peripheral device ports 110 configured to interact with one or more peripheral devices (e.g., displays 216 and accessories 212 of FIG. 2). The docking station 106 is configured to detect how much power is drawn from each of its peripheral device ports 110 and report the power consumption information to the system computer 138. In some embodiments, the docking station 106 may also be configured to monitor how much power is drawn from other power sources (e.g., the desktop AC and USB power 204 and/or the smart power 202 of FIG. 2) within the corresponding workstation 104. This power consumption data reported to the system computer 138 may be used to identify devices that are drawing power, a power state (e.g., hibernation) of devices, devices that are malfunctioning, and use of unauthorized devices at the workstations 104.

The reporting, by the docking station 106 at each of the workstations 104, to the system computer 138 of the power consumption information enables the system computer 138 to provide analytics regarding power consumption on a region level, an office level, a floor level, a zone level, a desk level, etc. (e.g., see FIGS. 3-6 and 9). These analytics may be detailed enough to show how much power is used by each port of the peripheral device ports 110 and ports of other power sources (e.g., see FIG. 9). These analytics may be displayed on UIs, printed, provided via emails to relevant personnel, or used and/or reported in other ways.

Workspace Occupancy and Scheduling

The docking station 106 at each of the workstations 104 of the workspace 102 may include a sensor 128 to monitor user occupancy at the corresponding one of the workstations 104 and generate sensor data relating to the user occupancy. The sensor 128 may be connected to the docking station 106 via a wired or wireless network. By way of non-limiting example, the sensor 128 may include an infrared sensor and/or thermal sensor to confirm user occupancy. A thermal sensor may be configured to monitor ambient temperature at the corresponding one of the workstations 104 and generate sensor data relating to the ambient temperature. In another non-limiting example, the sensor 128 may include a light sensor. A light sensor may be configured to monitor the amount of ambient light within a given workspace 102 and/or one of the corresponding workstations 104. Other examples of the sensor 128 may include a temperature sensor, a humidity sensor, a power use sensor (e.g., to sense when power is being drawn from the docking station 106 and/or other power supplies at the workstations 104), an image sensor (e.g., a camera), a motion sensor, a capacitive sensor, a mechanical sensor (e.g., in a chair), a radio frequency identification (RFID) sensor (e.g., to detect an RFID signature produced by a device such as an NFC device carried by the user and/or the computer device 132), a battery charge sensor of a battery that powers the sensor 128 or the IoT sensor pack 210 of FIG. 2, other sensors, or combinations thereof. The docking station 106 at each of the workstations 104 may also include a location identifier. The location identifier identifies a location of the docking station 106 and the corresponding one of the workstations 104 within the workspace 102.

In a non-limiting example, such a location identifier may be stored within a memory 130 of the docking station 106. In another non-limiting example, such location identifiers may utilize real-time locating systems (RTLS), which can allow for automatic identification and tracking of a given docking station (and/or gateway, peripheral devices, or sensors associated with the given docking station and/or an IoT platform) in real-time by the system computer 138. In such embodiments, each docking station 106 may include an RTLS tag or beacon that communicates with fixed reference points within the workspace 102 to allow for determining a current location of an associated docking station by the computer code for asset management 122 of the system computer.

Regardless of the type of location identifier used, each docking station 106 is configured to transmit the sensor data relating to the user occupancy and the location identifier to the system computer 138 through the network 114. In some embodiments, the sensor data and location identifiers may be transmitted directly from each of the docking stations 106 to the system computer 138. In some embodiments, the sensor data and location identifiers may be transmitted from docking station 106 to docking station 106 through the network 142, and to the system computer 138 through the network 114 by a preselected one of the docking stations 106.

The system computer 138 is configured to receive the location identifier and sensor data from each docking station 106, and store this information in one or more databases. As the system computer 138 is provided with the location identifier and the sensor data relating to the user occupancy for each docking station 106, the system computer 138 has sufficient information to determine a location and occupancy of each of the workstations 104 in the workspace 102, which enables a variety of useful functions. For example, the system computer 138 may be configured to use the location identifier and sensor data to generate usage data indicating how the workstations 104 are used (e.g., FIGS. 7 and 11). When irregularities are observed in usage of the workstations 104, alerts may be generated (e.g., see FIGS. 12-13).

Figure 7:
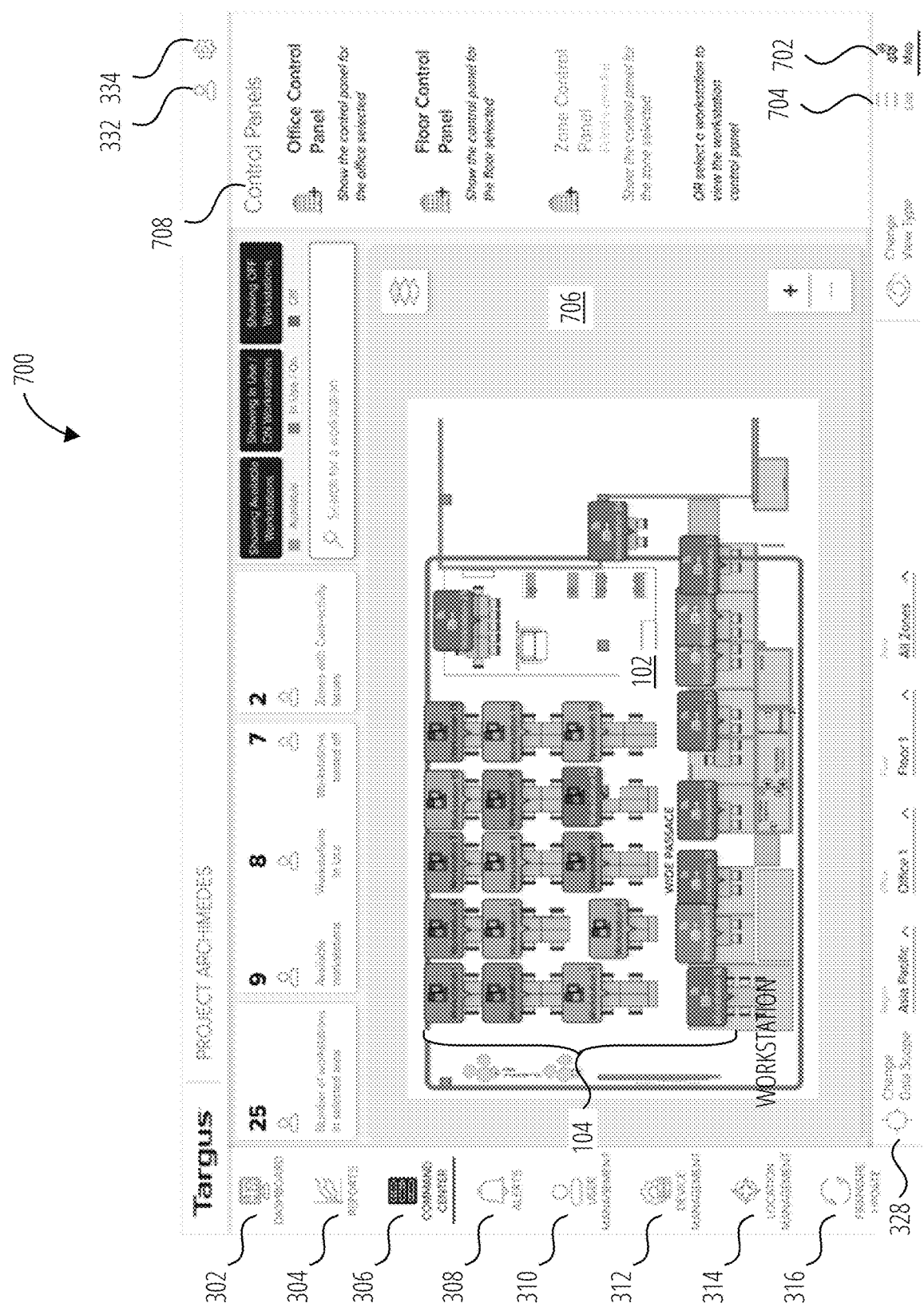
FIG. 7 is an example view of a command center UI, according to some embodiments.

In some embodiments, the computer code for occupancy 126 may be configured to instruct the system computer 138 to generate an availability notice indicating one or more of the workstations 104 that are currently unoccupied by a user and the locations of the currently unoccupied workstations 104 (e.g., FIG. 7). In some embodiments, the computer code for scheduling 118 may be configured to generate a schedule of currently available workstations 104. In some embodiments, the computer code for scheduling 118 may be configured to analyze usage data and generate a usage report indicative of user occupancy at workstations and their corresponding locations. The usage data may be reported using UIs (e.g., of web browsers, software applications of mobile devices or computers, etc.), online reports, printed reports, emails, other reports, or combinations thereof.

In some embodiments, the computer code for scheduling 118 may be configured to instruct the system computer 138 to analyze the usage data and generate an anticipated availability schedule indicating future likelihood of available workstations 104 and their corresponding locations. The future likelihood of available workstations 104 may be determined based on past observations of availability of the workstations 104. By way of non-limiting example, there may be some correlation between use of the workstations 104 from one time period to another (e.g., from day to day, from month to month, etc.). Also by way of non-limiting example, seasonal trends may be observed in the availability of the workstations 104. These correlations and trends may be leveraged to predict future availability of the workstations 104.

The ability to monitor and/or predict use of the workstations 104 may enable more efficient use of office space, equipment, and power. For example, if it is determined that fewer workstations 104 are needed to accommodate the demand for workstations 104, savings may be made by reducing real estate, equipment, and/or electrical power costs. Also, the ability to monitor and/or predict use of the workstations 104 may enable planning ahead for increased demand for workstations 104 rather than be left with insufficient workstations 104 once it is realized that more workstations 104 are needed while additional real estate and/or equipment is/are acquired.

In some embodiments, the system computer 138 may be configured to receive user reservation requests to reserve the workstations 104 for use by users. By way of non-limiting example, the system computer 138 may be configured to communicate, through the network 114, with one or more portable computer devices 140. The user reservation requests may be received from the portable computer devices 140. For example, an employee may transmit a user reservation request, via a personal mobile device (e.g., a smart phone, a tablet computer, etc.), to one of the workstations 104 before or after arriving at the workspace 102. The computer code for scheduling 118 may be configured to process the user reservation request and generate a reservation for a specific one of the workstations 104. The computer code for scheduling 118 may also be configured to generate a schedule and indicate that specific ones of the workstations 104 are reserved. The computer code for occupancy 126 may be configured to provide the schedule to the portable computer devices 140 to enable users to identify their assigned workstations 104. In some embodiments, the system computer 138 may be configured to provide, to the portable computer devices 140 directions, a map, or both for arriving at assigned workstations 104. In some embodiments, the system computer 138 may be configured to provide availability notices to the portable computer devices 140. In some embodiments the computer device 132 may be configured to confirm occupancy of specific reserved workstations 104 when users arrive at the workstations 104.

Employee Wayfinding and Security

As previously discussed, in some embodiments the sensor data received by the system computer 138 from each docking station 106 or smart peripheral devices may be indicative of user occupancy at the corresponding one of the workstations 104. As a result, the system computer 138 may be configured to generate usage data that is based on the sensor data. For example, the computer code for scheduling 118 may be configured to instruct the system computer 138 to generate a schedule of users currently assigned to workstations 104 and the locations of the assigned workstations 104. In another example, closed-circuit television (CCTV) cameras that include location identifiers (e.g., using RTLS tags) and are capable of communicating with the system computer 138 (e.g., via the network 114 and the computer code for occupancy 126 or asset management 122) may be used for tracking users or assets. For instance, such CCTV cameras may include facial recognition software that allows for communicating an identification and a location of a given user to the system computer 138 via the network 114. In some embodiments, proprietary algorithms may also be used to aid in tracking users. Accordingly, the system computer 138 is capable of tracking locations of users in various ways.

In a work environment where employees do not have workstations 104 assigned permanently for their use, this may enable users (e.g., other employees, IT professionals, administrators, managers, etc.) to locate employees within the workspace 102. By way of non-limiting example, a user management UI 1100 may be provided, as will be discussed in more detail below. If irregularities are detected in the finding employees, or if unauthorized users are located, alerts may be generated (e.g., see FIGS. 12-13) by the computer code for reports and alerts 146 of the system computer 138.

In some embodiments the computer code for scheduling 118 may be configured to instruct the system computer 138 to generate a schedule of currently available workstations 104 and the location of the currently available workstations 104. In some embodiments, the computer code for scheduling 118 may be configured to instruct the system computer 138 to generate an occupancy alert when usage data (e.g., data indicating laptop connections, IR sensing, etc.) indicates user occupancy at a scheduled available workstation of the workstations 104. In some embodiments, the computer code for scheduling 118 may be configured to instruct the system computer 138 to analyze usage data and generate a usage report indicative of user occupancy at workstations 104 and corresponding locations. In some embodiments, the computer code for scheduling 118 may be configured to instruct the system computer 138 to generate an availability alert when usage data indicates extended vacancy at a scheduled occupied workstation of the workstations 104.

In some embodiments, the computer code for scheduling 118 may be configured to instruct the system computer 138 to process a user reservation request to reserve one of the workstations 104, generate a reservation for a specific available one of the workstations 104, and generate the schedule and indicate that the specific one of the workstations 104 is reserved. In some embodiments, the computer code for occupancy 126 may be configured to instruct the system computer 138 to confirm user occupancy of the specific workstation during the reservation based on the usage data.

In some embodiments the system computer 138 is configured to communicate with the portable computer devices 140 over the network 114 to provide the schedule currently assigned to the workstations 104 and the location of the assigned workstations 104. In some embodiments, the computer code for scheduling 118 may be configured to instruct the system computer 138 to provide the location of a user's assigned one of the workstations 104 responsive to a query for the specific user. In some embodiments, the location of the user's assigned workstation of the workstations 104 may be represented in a graphical user interface including a map showing the location of the user's assigned workstation. In some embodiments, NFC/RFID devices may be used to provide user access (e.g., authorization) and/or control of facilities and equipment of the workspace 102 for security reasons.

Power Conservation Management

In some embodiments, computer code for power conservation management 144 (or system management 124) of system computer 138 may be configured to dynamically control peripheral devices in a given workspace 102 or workstation 104. For instance, as discussed briefly herein, a given workstation 104 or docking station 106 may include one or more sensors 128 that comprise an ambient light sensor configured to measure ambient light within a given workspace or workstation. Outputs of such a light sensor may then be provided to the system computer 138 (e.g., via the docking station 106 and the network 114). In response, the computer code for power conservation management 144 may communicate with one or more smart light devices (or devices that emit light such as a TV, monitor, projector, digital display, etc.) via the network 114 to adjust the type of light being emitted from the one or more smart light devices. In an example, one of the one or more smart light devices may adjust a brightness level, intensity, or color temperature of the light being emitted by the smart light device in response to receiving a particular measurement of ambient light at the system computer 138. In this way, power may be conserved and the usage life of electronic devices may be extended, among other benefits.

Notably, power may often be provided to devices at times when they do not necessarily need power (e.g., a monitor that is connected to a power outlet while not being connected to a computing device and/or not in use currently). When a large number of such devices are drawing power (e.g., hundreds or thousands of devices within a building) a substantial amount of used power can be unnecessary and/or wasteful. Accordingly, the computer code for power conservation management 144 may be configured to dynamically control, optimize, and/or conserve power provided to devices located within a given workspace 102 or workstation 104, including docking stations, peripheral devices, sensors, monitors, laptops, and so forth.

In a non-limiting example, the computer code for power conservation management 144 may determine whether devices associated with a particular workstation are currently in a state that requires the provision of power based on a current measurement of ambient light by an ambient light sensor within the given workspace or workstation. For instance, when the measured ambient light is below a particular threshold within a given workspace or workstation, the computer code for power conservation management may determine that the devices within the workspace or workstation are not in use. As such, the computer code for power conservation management may further determine that the provision of power to any devices within the workstation or workspace is unnecessary. In such a scenario, the computer code for power conservation management may then block the further provision of power to such devices (other than the ambient light sensor and/or any devices for sending ambient light sensors measurements to the system computer, if applicable) until the ambient light sensor generates a measurement that shows evidence of occupancy or use of the given workstation or workspace.

In another non-limiting example, the system computer may determine that power is being unnecessarily provided to and/or drawn by devices within a given workstation or workspace based on the amount of power consumed by such devices. For instance, the system computer may analyze the power consumption data provided to the system computer, as further described herein, in relation to the amount of power currently being consumed by one or more devices within the workspace or workstation. More specifically, the computer code for power conservation management may determine whether the amount of power currently being consumed by one or more devices is consistent with the amount of power consumed by such devices when they are known to be in use or alternatively, when such devices are known to be unoccupied, sleeping, hibernating, or in a similar state of non-use based on an analysis of the power consumption data. The computer code for power conservation management may then utilize such analyses to determine when to block the provision of power to one or more devices to ensure that power is not unnecessarily used.

In another non-limiting example, the computer code for power conservation management 144 may be configured to dynamically control temperature in a given workspace 102 or workstation 104. For instance, as discussed briefly herein, a given workstation 104 or docking station 106 may include one or more sensors 128 that comprise a temperature sensor (e.g., a thermal sensor) configured to measure ambient temperature within a given workspace or workstation. Outputs of such a temperature sensor may then be provided to the system computer 138. In response, the computer code for power conservation management 144 may communicate with one or more temperature-controlling devices (e.g., a smart thermostat) via the network 114 to adjust the temperature in the workspace and/or workstation. While specific examples of particular peripheral devices are described herein, it should be understood that any number of similar devices may be similarly utilized by the system computer 138. For instance, air quality devices (e.g., in relation to humidity, carbon dioxide, etc.), power devices, smart home devices, and so forth may be used by the system computer 138.

Historical Data Usage

The system computer 138 may also maintain a database of historical data. For instance, such a historical database may include data received from environmental sensors in conjunction with known locations of such sensors (e.g., via the location identifiers of docking stations associated with the sensors) to improve dynamic control of and/or predict environmental factors within the workspace 102 and/or one of the one or more corresponding workstations 104. In some embodiments, the historical sensor data database may include location data for each sensor from which sensor data has been received and stored. Such location data may include location data for a given sensor relative to the location of other sensors, docking stations, workstations, workspaces (e.g., offices, floors, buildings, and so forth), peripheral devices, and so forth. For instance the computer code for power conservation management 144 may be able to analyze historical data generated by an ambient light sensor or an ambient temperature sensor for a given time of year (e.g., spring), a given day of the year (e.g., a particular day in January), a given time of day during a particular time of year (e.g., typical afternoons during the summer months), and so forth. The system computer may then utilize such analyses for improved and/or optimal control and prediction of environmental factors within a given workspace and/or workstation to allow for enhanced power conservation.

In a non-limiting example, a given workspace and/or workstation may be located in a particular position within a building that is associated with heating up in the afternoon (e.g., an office with a large window located on the western side of a building). In such an example, the computer code for power conservation management may communicate with a thermostat near the given workspace and/or workstation to begin providing cool air or reduce the provision of warm air at an optimal time prior to a time when increased heat is known to occur within the workspace and/or workstation. In this way, the system computer 138 may utilize the sensors 128, location identifiers, and/or historical data to improve power conservation associated with environmental factors and predictions of such.

The historical database may also include historical data related to the determined occupancy of a given workspace and/or workstation. Such historical occupancy data may then be analyzed and utilized by the system computer in various ways. For instance, the computer code for power conservation management may analyze historical occupancy to determine when the given workspace and/or workstation has been historically used (or unused). The computer code may then use such analyses to determine appropriate times to block the provision of power to devices within the given workspace and/or workstation at times during which the workspace and/or workstation has historically been unused (e.g., during particular days of the week, particular portions of a day, and so forth).

The system computer may also analyze historical occupancy data to perform a number of tasks based on intelligent insights gained from such analyses. For instance, the system computer may make a number of determinations based on an analysis of times at which one or more devices within a given workspace and/or workstation are not being consistently used. Such determinations may allow for making more informed decisions regarding the need for additional (or less) workspaces and/or workstations, devices, sensors, and so forth; potential availability/scheduling of workspaces and/or workstations; power conservation with respect to particular devices (e.g., blocking the provision of power during times of consistent non-use); and so forth. In a particular example, the system computer may determine that a given workstation is only used on Tuesdays and Thursdays by a particular individual. Based on such a determination, the system computer may then ensure that the provision of power to devices within the given workstation is blocked on Mondays, Wednesdays, and Fridays (unless it receives data that otherwise shows occupancy of the given workstation). Similarly, the system computer may utilize such information for scheduling purposes, asset management purposes, and so forth.

While examples of utilizing various types of historical data within the historical database are specifically discussed herein, the historical database may include any type of historical data related to data that is generated and tracked as further described herein, including occupancy data, scheduling data, thermal imaging data, asset management data, system management data, power conservation management data, reports and alerts data, and so forth.

Asset Management

In some embodiments, each docking station 106 is configured to monitor user-entered input of the corresponding computer device 132 located at its workstation 104 (e.g., using the computer code for asset management 122). Each docking station 106 may transmit information indicating this monitored user-entered input to the system computer 138. Also, as previously discussed, workstation 104 utilization, sensor data, and detailed power consumption information is available to the system computer 138, which together enable a detailed picture to be painted of assets used at the workstations 104. As a result, this information may be used to keep inventories of assets. Also, power consumption profiles of peripheral devices connected to the docking stations 106 and other power supplies may be compared to expected power consumption profiles to identify and monitor these peripheral devices. When the power consumption profile of a device deviates from the expected power consumption profile it may be determined that the device is malfunctioning or needs maintenance. Also, if a pattern of users avoiding use of a particular one of the workstations 104 is observed, it may be determined that an asset may be malfunctioning or need maintenance. Alerts may be generated to indicate these issues to IT personnel (e.g., see FIGS. 12 and 13).

In some embodiments, each docking station 106 is configured to identify one or more peripheral devices currently communicating with the docking station 106 and generate peripheral identifications identifying the peripheral devices. Each docking station 106 may transmit these peripheral identifications to the system computer 138. Notably, peripheral devices may include devices that connect to, or communicate with, the docking station 106 using hard-wired connections or wireless connections.

Furthermore, in some embodiments, each peripheral device and/or sensor may include a location identifier. For instance, such location identifiers may utilize RTLS to allow for automatic identification and tracking of any peripheral device and/or sensor in real-time by the system computer 138. In such embodiments, each peripheral device and/or sensor may include an RTLS tag that communicates with fixed reference points within the workspace 102 to allow for determining a current location of an associated peripheral device or sensor by the computer code for asset management 122 of the system computer.

In some embodiments, legacy hardware (e.g., docking stations, sensors, peripheral devices, and so forth) may be utilized to provide the functionality further described herein (e.g., occupancy, scheduling, asset/user tracking and management, power conservation, and so forth) by loading firmware on to such devices that is configured to allow such legacy devices to communicate with the system computer 138. Similarly, various hardware modifications (e.g., addition of BLE components) may be performed with respect to such legacy hardware to provide the functionality further described herein.

Remote Device Management and Actuation

Figure 10:
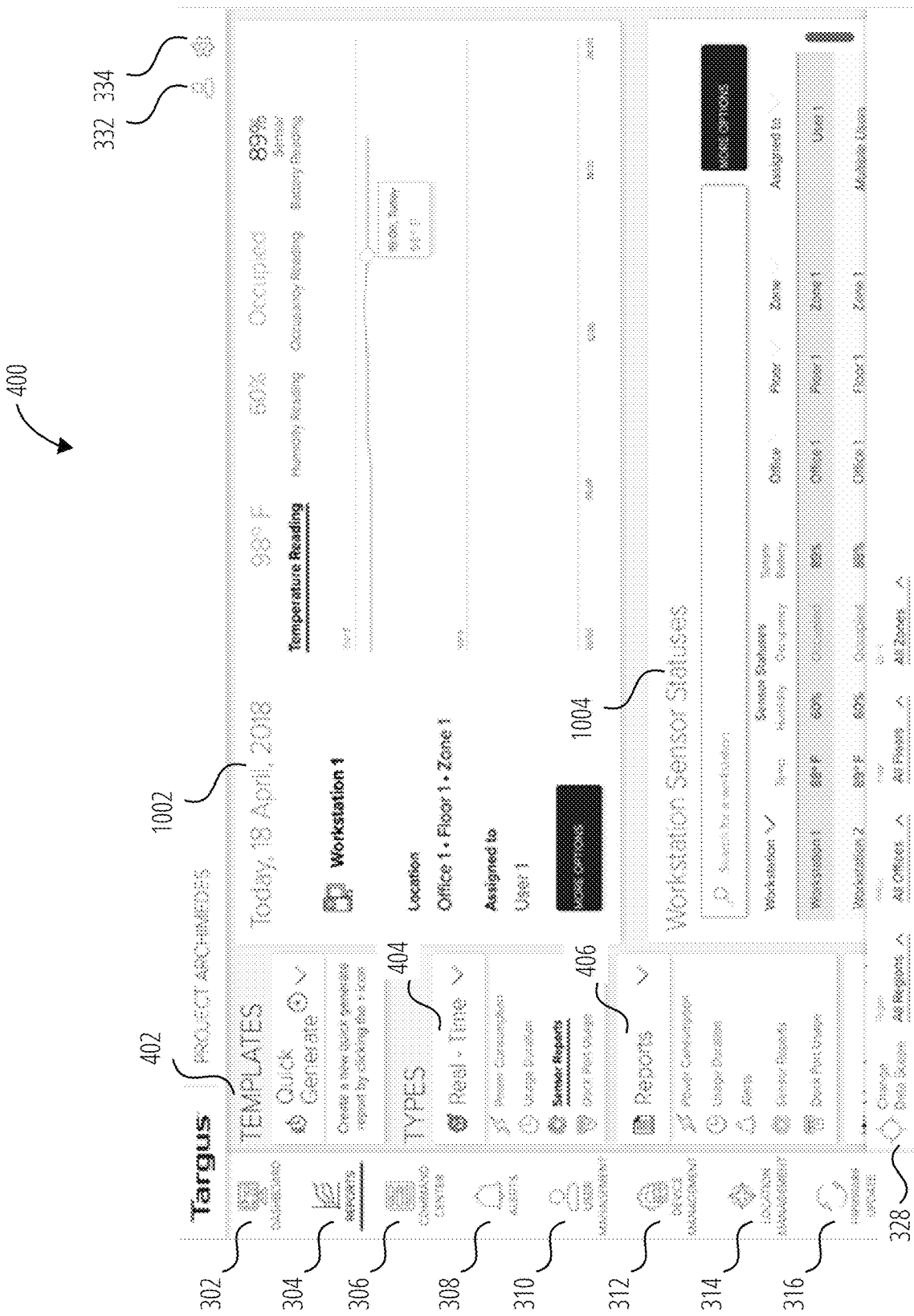
FIG. 10 is an example view of a reports UI, according to some embodiments.
Figure 11:
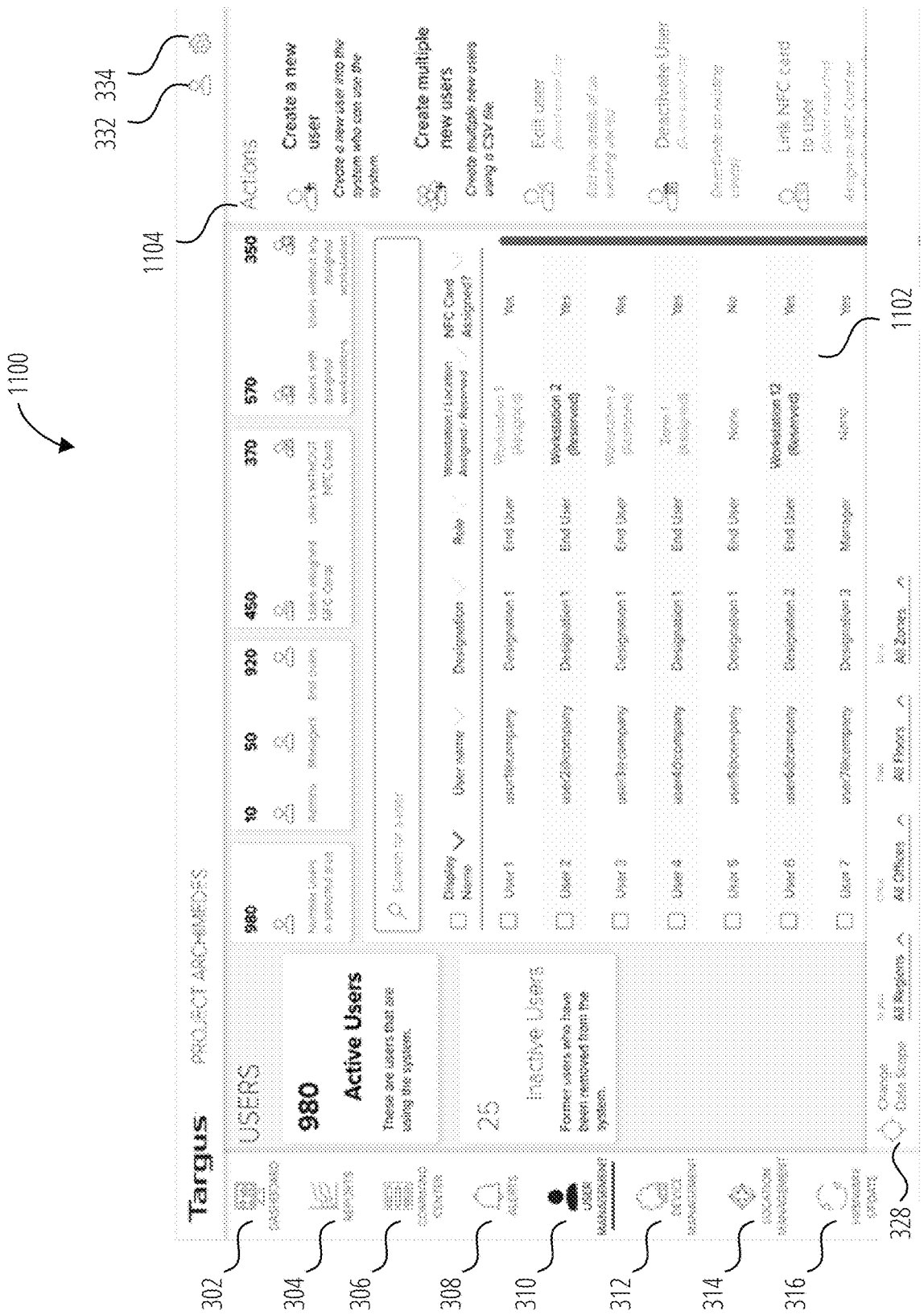
FIG. 11 is an example view of a user management UI, according to some embodiments.
Figure 12:
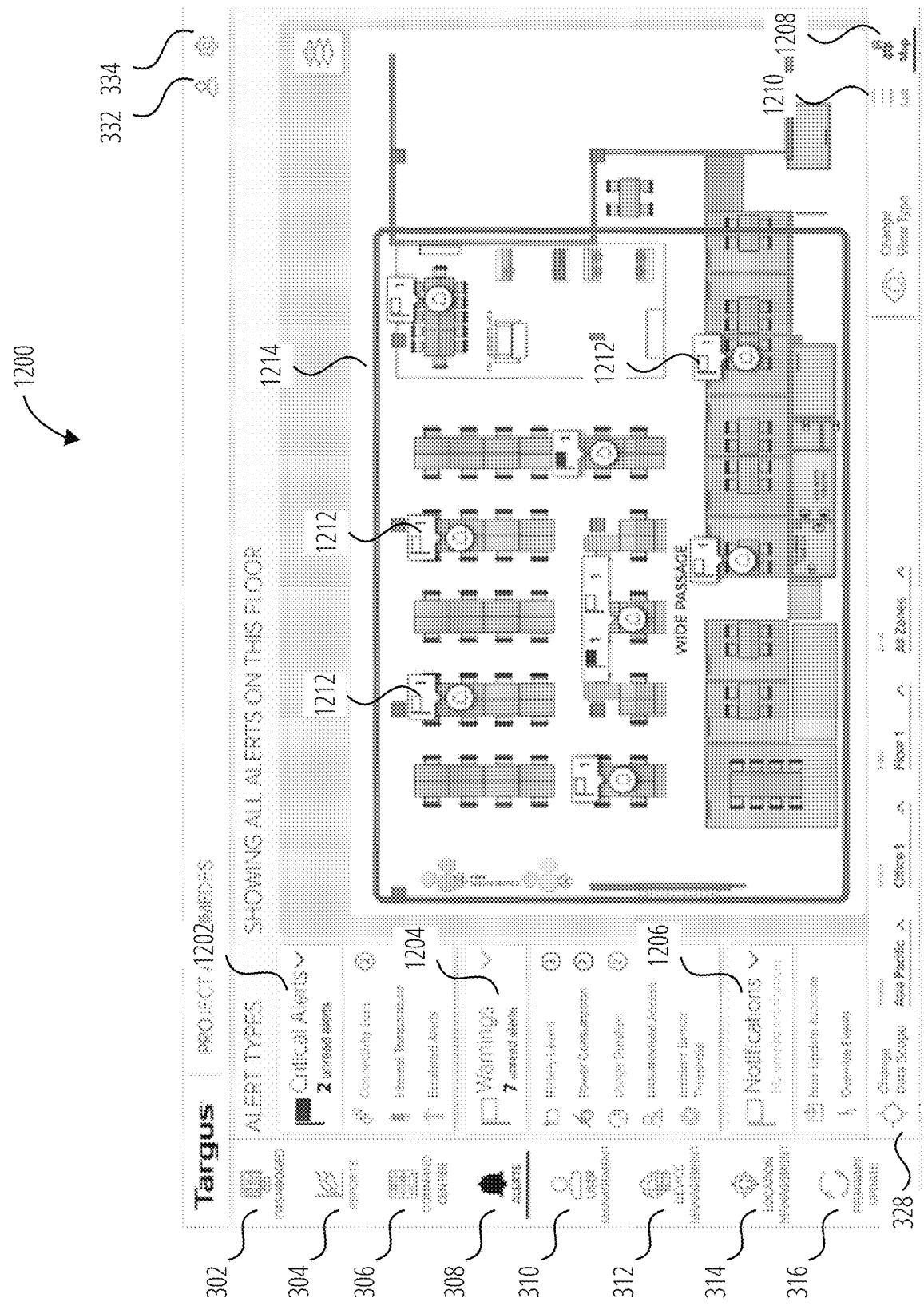
FIG. 12 is an example view of an alerts UI, according to some embodiments.
Figure 13:
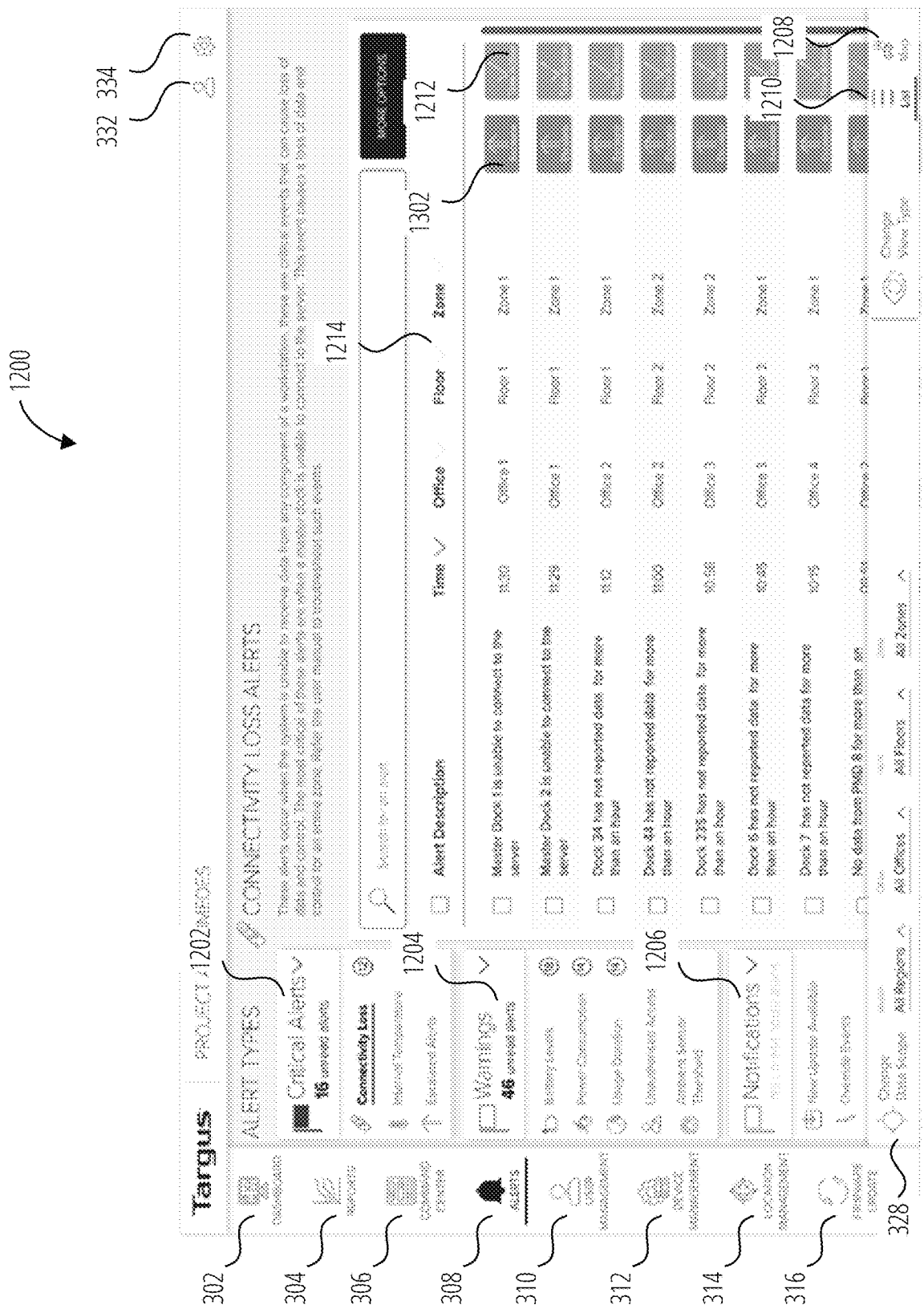
FIG. 13 is an example view of an alerts UI, according to some embodiments.

IT personnel may be provided the ability to view information received from the docking stations 106 (e.g., see FIGS. 3-13). This information may enable IT personnel to view power consumption information (e.g., FIGS. 3-6 and 9), obtain information about users (e.g., FIGS. 7 and 11), remotely update docking stations and power management devices (e.g., FIG. 8), view how specific ports are used at the workstations 104 (e.g., FIG. 9), review sensor readings from the workstations 104, and receive and take action for alerts (FIGS. 12 and 13).

In some embodiments, the system computer 138 is configured to enable remote software installation, remote software uninstallation, and software updating of each docking station 106 (and of the smart power 202, and the IoT sensor pack 210 discussed below with reference to FIG. 2). In some embodiments, the system computer 138 is configured to enable remote software installation, remote software uninstallation, and software updating of each computer device 132. In some embodiments, the system computer 138 is configured to enable remote resetting of each docking station 106 (and of the smart power 202, and the IoT sensor pack 210 of FIG. 2). In some embodiments, the system computer 138 is configured to enable remote resetting of each computer device 132.

Management Dashboard with Visual Heat-Mapping

A dashboard may be provided by the system computer 138 (e.g., using the computer code for system management 124). Examples of UIs (e.g., of web pages and/or mobile applications) that are provided by the dashboard are illustrated in FIGS. 3-13. Also, heat-maps may be used to illustrate measured metrics throughout the workspace 102. For example, a total power consumption heat-map 604 (FIG. 6) may be provided to enable a user to easily and quickly view and understand how power consumption is distributed throughout the workspace 102 at varying levels of detail. Other metrics may be illustrated using heat-maps. For example, ambient temperature at the workstations 104 may be illustrated using a heat-map similar to that of FIG. 6 (e.g., using the computer code for thermal imaging 120). In some embodiments, the heat-maps provided by the system computer 138 may update based on new sensor data in real-time. In some embodiments, the heat-maps provided by the system computer 138 may be snapshots at particular points in time. In some embodiments, the system computer 138 may analyze the sensor data to generate a chart of heat-mapping over a time interval. In some embodiments, the system computer 138 is configured to analyze the sensor data and generate a UI with indication of electronic devices (e.g., peripherals, other devices, etc.) at the workstations 104.

FIG. 2 is a block diagram of an example of a portion of the system 100. FIG. 2 shows the docking station 106 connected to the computer device 132 at a workstation (e.g., one of the workstations 104 of FIG. 1) via the network connection 134 and the power 136. The docking station 106 is also connected to one or more accessories 212 (e.g., via the peripheral device ports 110 of FIG. 1), which may include a pointing device (e.g., a mouse, a trackpad, etc.), a printer, a scanner, a camera (e.g., a webcam, a video camera, etc.), a keyboard, a microphone, a speaker, other accessories, or combinations thereof. The docking station 106 is further connected to one or more electronic displays 216 (e.g., via the peripheral device ports 110 of FIG. 1).

By way of non-limiting example, the docking station 106 may include a high-performance, smart USB-C dual 4K docking station with 100 Watt power delivery. In this example, the power 136 and network connection 134 may be provided to the computer device 132 via a USB-C interface from the docking station 106, and the electronic displays 216 may include 4K displays. The docking station 106 may also be connected (e.g., via the power input 108 of FIG. 1) to a source of smart power 202 (e.g., an under-desk mounted smart power strip with four power outlets), which in turn is connected to a source of desktop AC and USB power 204 (e.g., a desktop mounted satellite AC power strip with, for example, two outlets and a USB power port). The docking station 106 may further be connected to an IoT sensor pack 210, which in some embodiments may include the sensor 128 of FIG. 1. By way of non-limiting example, the IoT sensor pack 210 may include an under-desk mounted sensor box including multiple data capture sensors (e.g., a thermal sensor, an infrared sensor, a motion sensor, an ambient temperature sensor, a humidity sensor, a pressure sensor, etc.). As a specific, non-limiting example, the IoT sensor pack 210 may include thermal, humidity, and pressure sensors to monitor ambient temperature, humidity, and pressure, respectively, at the workstation 104 and generate sensor data relating to the ambient temperature, humidity, and pressure.

The docking station 106 may be configured to communicate with an in-house IT network 218 and/or the mesh network 142 (FIG. 1) to other docking stations 106, which in turn communicates with a cloud with analytics/in house server 214. The in-house IT network 218 and the cloud with analytics/in house server 214 may together perform the functions discussed above for the system computer 138. By way of non-limiting example, the cloud with analytics/in house server 214 may provide an IT administration UI 208 to a computer of an IT professional. The IT administration UI 208 may enable the IT professional to perform remote desktop management functions such as remote reset and firmware updates of the docking station 106. Also, the cloud with analytics/in house server 214 may provide a facilities UI 206 to a computer of facilities/space planners/real estate/change management. The facilities UI 206 may be configured to provide workspace utilization reporting. Furthermore, the cloud/in house server with analytics/in house server 214 may provide an end user UI 220 and mobile software applications (e.g., to the portable computer devices 140) to enable reservation of workstations, wayfinding of employees, control of peripheral devices (e.g., smart thermostat), and so forth.

FIGS. 3-13 are views of various example graphical user interfaces (UIs) 300, 400, 700, 800, 1100, and 1200 that may be provided by the system computer 138 of FIG. 1. These UIs include a main dashboard UI 300 (FIG. 3), a reports UI 400 (FIGS. 4-6, 9, and 10), a command center UI 700 (FIG. 7), a firmware update UI 800, a user management UI 1100, and an alerts UI 1200. It will be understood that some or all of these UIs 300, 400, 700, 800, 1100, and 1200 may be displayed on the system computer 138, the computer device 132 of any of the workstations 104, the electronic displays 216, the portable computer devices 140, or combinations thereof (FIG. 1) (e.g., using web browsers, web applications, software applications, mobile applications, etc.). In some embodiments, some or all of these UIs 300, 400, 700, 800, 1100, and 1200 may be part of the IT administration UI 208, the facilities UI 206, or both (FIG. 2). It should be understood that in some embodiments a user with proper network permissions may access the UIs 300, 400, 700, 800, and 1100 on the system computer 138 itself, on an IT department computer (not shown), on any computer device 132 in the workspace 102, on a workspace management computer (not shown) located at the workspace 102 or elsewhere, the portable computer devices 140, or any other devices (e.g., mobile devices) that are in communication with the network 114.

The UIs 300, 400, 700, 800, 1100, and 1200 each include UI links 302-316 to enable a user to, if selected by the user, quickly and easily navigate between the various UIs 300, 400, 700, 800, 1100, and 1200. For example, the UIs 300, 400, 700, 800, 1100, and 1200 include a main dashboard link 302 configured to navigate to the main dashboard UI 300, a reports link 304 configured to navigate to the reports UI 400, a command center link 306 configured to navigate to the command center UI 700, an alerts link 308 configured to navigate to the alerts UI 1200, a user management link 310 configured to navigate to the user management UI 1100, a device management link 312 configured to navigate to a device management UI (not shown), a location management link 314 configured to navigate to a location management UI (not shown), and a firmware update link 316 configured to navigate to the firmware update UI 800.

The UIs 300, 400, 700, 800, 1100, and 1200 each also include a change data scope menu 328 configured to enable a user to select between analyzing data originating from the docking station 106 of each of the workstations 104 (FIG. 1) of all regions or one or more selected regions, all offices or one or more selected offices, all floors or one or more selected floors within a selected office or offices, and all zones or one or more selected zones of one or more selected floors, offices, or regions. As a result, the UIs 300, 400, 700, 800, 1100, and 1200 allow the user to narrow or broaden the data shown to fit the selected scope.

The UIs 300, 400, 700, 800, 1100, and 1200 each further include a user profile option 332 and a settings option 334. The user profile option 332, if selected, may cause a user profile UI (not shown) to be presented to the user. The user profile UI may enable the user to log in, log out, set user preferences, navigate user permissions, perform other user-specific tasks, or combinations thereof. The settings option 334, if selected, may cause a settings UI (not shown) to be presented to the user. The settings UI may provide various settings options for the system 100 (FIG. 1) and the UIs 300, 400, 700, 800, 1100, and 1200.

Figure 3:
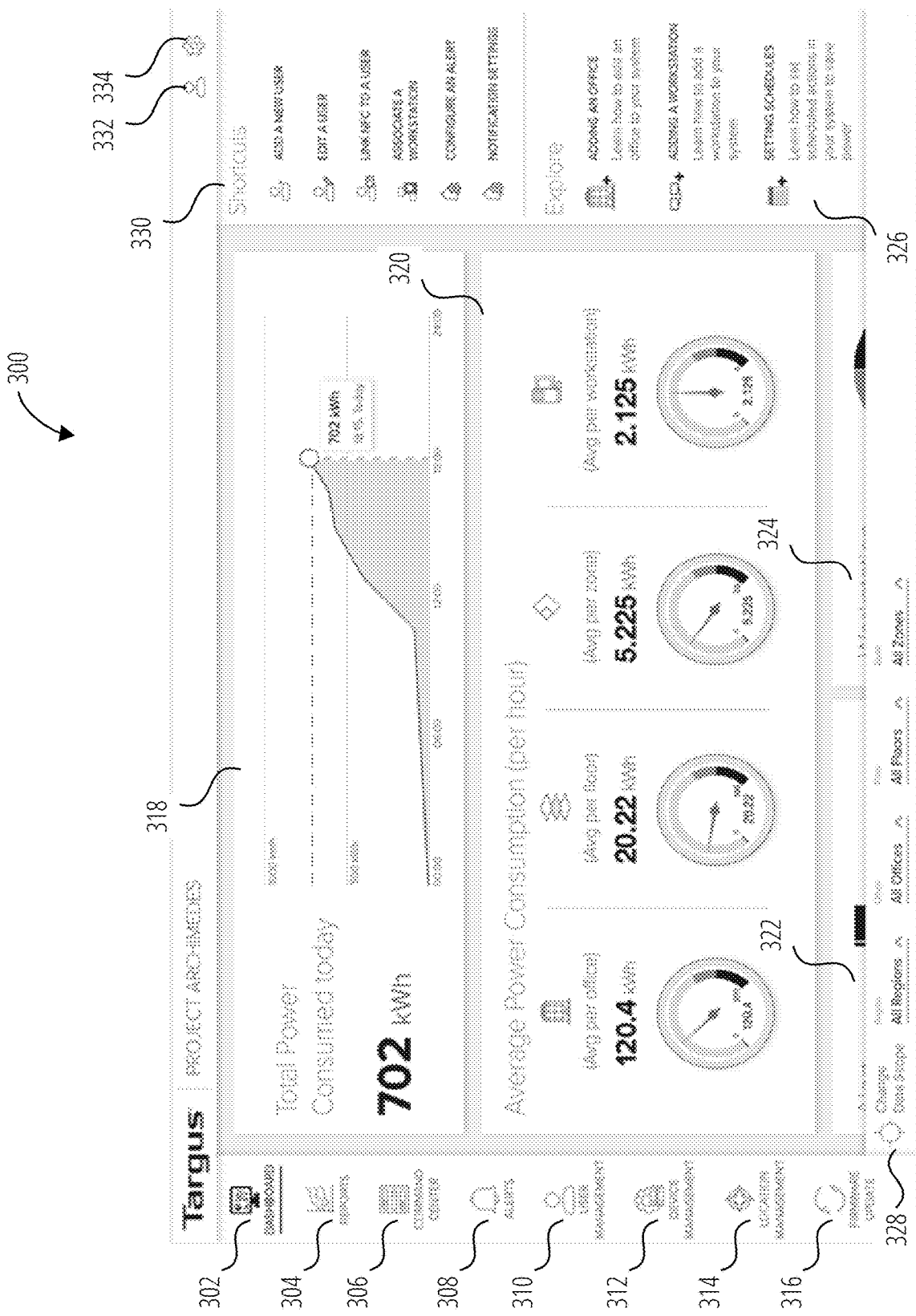
FIG. 3 is an example view of a main dashboard user interface (UI), according to some embodiments.

FIG. 3 is an example view of the main dashboard UI 300, according to some embodiments. The main dashboard UI 300 includes a total power consumed today field 318 configured to indicate total power consumed by the system 100 (FIG. 1) during a current day. For example, FIG. 3 indicates that 702 kilo-Watt hours have been consumed as of 18:15, and the total power consumed today field 318 provides a plot of the total power consumed as a function of time. As a result, the total power consumed today field 318 enables a user to monitor how much total power has been consumed at any given time of the day, and see at what times of the day more or less power was consumed.

The main dashboard UI 300 also includes an average power consumption field 320 configured to indicate average power consumed by the system 100. In the example shown in FIG. 3, the average power consumption field 320 indicates an average power consumed per office (e.g., office location), an average power consumed per floor within the office, an average power consumed per zone (e.g., a subdivision of the office), and an average power consumed per workstation (e.g., the workstations 104 of FIG. 1). It will be noted that the change data scope menu 328 allows the user to change the scope of the data displayed in the total power consumed today field 318 and the average power consumption field 320. The main dashboard UI 300 may also include other fields, such as an alerts field 322 and a workstation field 324 configured to provide information regarding alerts and the workstations 104, respectively.

The main dashboard UI 300 further includes a shortcuts field 330 configured to provide user-selectable shortcuts to enable a user of the main dashboard UI 300 to quickly and easily navigate to other UIs or specific sub-fields of the other UIs. For example, the shortcuts field 330 of FIG. 3 includes an add new user shortcut, an edit a user shortcut, a link NFC to a user shortcut, an associate a workstation shortcut, a configure an alert shortcut, and a notification settings shortcut.

The main dashboard UI 300 further includes an explore field 326 configured to provide user-selectable links to instructions for the user to follow to direct operation of the system 100. For example, the explore field 326 of FIG. 3 illustrates user-selectable links to instructions for learning how to add an office, learning how to add a workstation, and learning how to set scheduled actions to save power.

Figure 4:
FIG. 4 is an example view of a reports UI, according to some embodiments.

FIG. 4 is an example view of the reports UI 400, according to some embodiments. The reports UI 400 is configured to enable a user to generate reports regarding the system 100 of FIG. 1. For example, the reports UI 400 is configured to generate and present reports for power consumption, usage duration, sensor data (e.g., collected by the sensor 128 of FIG. 1 and/or the IoT sensor pack 210 of FIG. 2), dock port usage, alerts, other reports, or combinations thereof. The reports UI 400 includes a templates field 402, a types field 404, and a reports field 406. The templates field 402 is configured to, responsive to a user selection of a Quick Generate option within the templates field 402, quickly generate a report.

Figure 5:
FIG. 5 is an example view of a reports UI, according to some embodiments.

The types field 404 is configured to enable the user to select a type of report to generate (e.g., using the Quick Generate option in the templates field 402). For example, the types field 404 of FIG. 4 enables the user to select between a power consumption report, a usage duration report, a sensor report, and a dock port usage report. The reports UI 400 of FIG. 4 shows a power consumption report field 408 and a top power consuming workstations field 410, which were generated responsive to a user selecting the Quick Generate option of the templates field 402 and the power consumption report option from the types field 404. The power consumption report field 408 of FIG. 4 shows a cumulative power consumption option 412 selected, which causes the power consumption report field 408 to show a total power consumed, an average power consumption per hour, and a plot of the cumulative power consumption throughout the day as a function of time. FIG. 5 below illustrates the reports UI 400 including the power consumption report field 408 with an hourly power consumption option 414 selected instead of the cumulative power consumption option 412.

The top power consuming workstations field 410 is configured to indicate the top power consuming workstations 104 (FIG. 1) (e.g., in order from top power consuming to least power consuming), a total power consumed by these workstations 104, how much of the total power was consumed from an outlet of the docking station 106 (FIGS. 1 and 2) and various power outlets of the smart power 202 (FIG. 2) (e.g., GPO1, GPO2, GPO3, etc.), which office, floor, and zone the workstations 104 are located in, and which user or users the workstations 104 were assigned to. The top power consuming workstations field 410 may also provide a search bar to enable the user to search for a specific one of the workstations 104 to gather the power consumption information regarding the specific one of the workstations 104.

Figure 6:
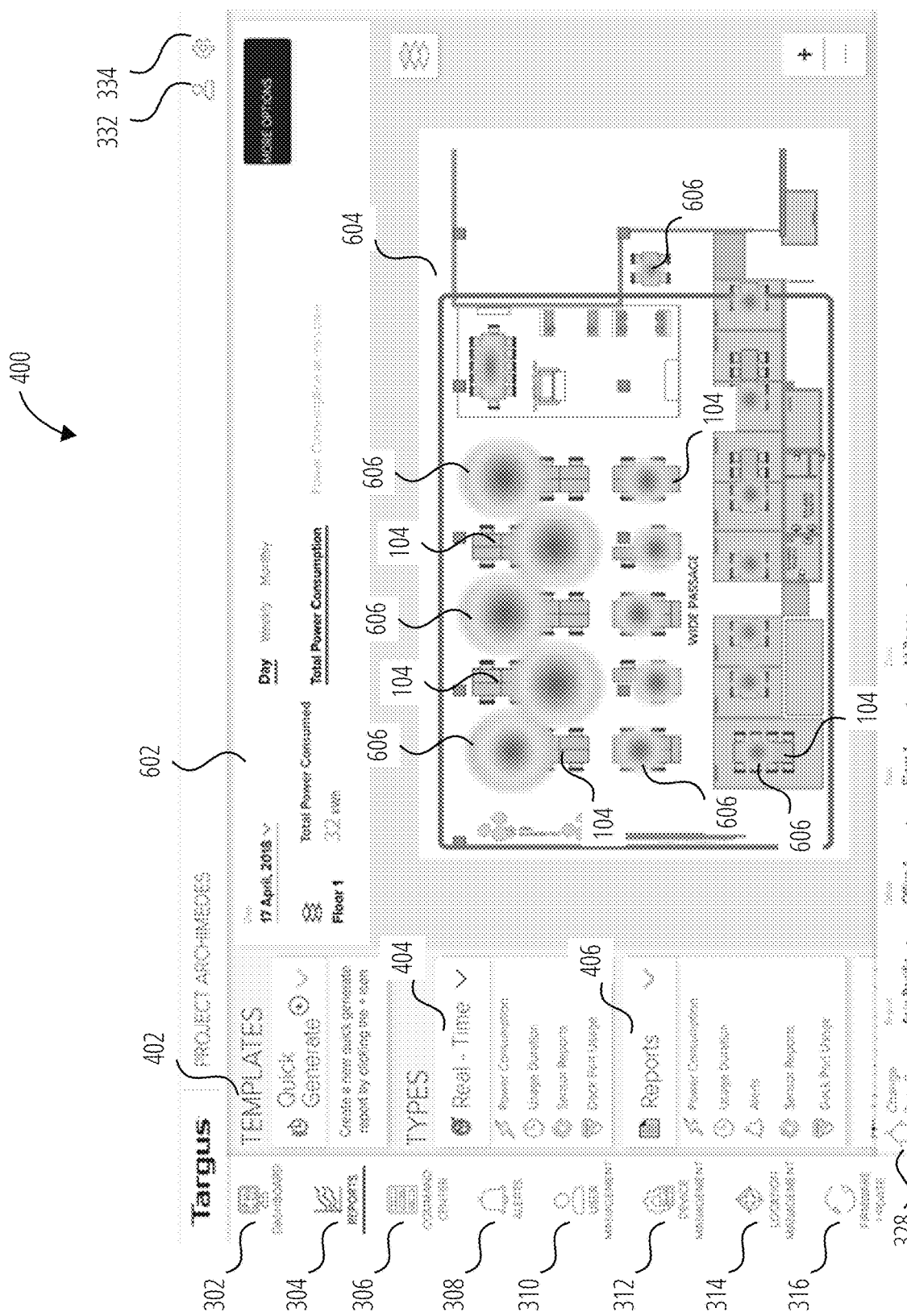
FIG. 6 is an example view of a reports UI, according to some embodiments.

The reports field 406 of the reports UI 400 is configured to provide user-selectable options for generating a power consumption report, a usage duration report, an alert report, sensor reports, and a dock port usage report. FIG. 6 below shows a heat-map field 602 including a total power consumption heat-map 604, which may be provided by the reports UI 400 responsive to a user selection of the power consumption report option within the reports field 406.

FIG. 5 is an example view of the reports UI 400, according to some embodiments. The reports UI 400 of FIG. 5 is the same as the reports UI 400 of FIG. 4 except that an hourly power consumption option 414 of the power consumption report field 408 has been selected, which causes the power consumption report field 408 to display a plot of hourly power consumption during the day as a function of time.

FIG. 6 is an example view of the reports UI 400, according to some embodiments. FIG. 6 shows a heat-map field 602 including a total power consumption heat-map 604, which may be provided by the reports UI 400 responsive to a user selection of the power consumption report option within the reports field 406. The total power consumption heat-map 604 includes a map of at least a portion of the workspace 102 (FIG. 1) that shows the workstations 104 and includes circular heat indicators 606 of varying size to indicate a total amount of power consumed at each of the workstations 104. In the example shown in FIG. 6, a larger size of the circular heat indicators 606 indicates a higher total power consumed at the workstations 104 as opposed to a smaller size of the circular heat indicators 606, which indicates a lower total power consumed at the workstations 104. The heat-map field 602 enables the user to graphically view areas within the workspace 102 where more or less power is consumed at the workstations 104, which may give an accurate idea of workstations 104 that are not being used (e.g., because less desirability of location, poor functioning of equipment, etc.) and workstations 104 that are being used improperly (e.g., where too much power is being used, which may indicate malfunctioning of equipment or use of unauthorized devices).

It should be noted that in some embodiments, heat indicators that are not circular, but have a different shape (e.g., oval, square, rectangle, triangle, pentagon, octagon, other polygon, other shape, or combinations thereof), may be used. Also, some other indicator other than the size of a shape may be used in the heat-map field 602. For example, variation in colors on the heat-map field 602 may be used to illustrate variation in, for example, power consumption.

It should also be noted that heat-maps may be used herein to illustrate metrics other than total power consumed. For example, heat-maps may be used to illustrate time of occupancy of the workstations 104, temperature at the workstations 104, humidity at the workstations 104, battery charge of backup batteries at the workstations 104, other metrics, or combinations thereof.

FIG. 7 is an example view of the command center UI 700, according to some embodiments. The command center UI 700 is configured to indicate workstation configurations for a selected area (e.g., selected using the change data scope menu 328). The command center UI 700 includes a workstation configuration field 706 configured to provide workstation configuration information. The command center UI 700 also includes a map view option 702 and a list view option 704 configured to cause the workstation configuration field 706 to present the workstation configuration information in a map form and a list form, respectively, when selected by the user. In the example of FIG. 7, the map view option 702 is selected, so the workstation configuration field 706 is shown in the map form, including a map of the selected portion of the workspace 102. The workstations 104 of the selected portion of the workspace 102 are shown in the workstation configuration field 706.

The command center UI 700 is configured to indicate a number of workstations 104, a number of available workstations 104, a number of workstations 104 in use, and a number of workstations 104 that are turned off within the selected area. In some embodiments, the workstations 104 shown within the workstation configuration field 706 may be color coded to indicate which of the workstations 104 are available, are in use/powered on, and are powered off. If the list view option 704 were selected, similar information may be presented in a list format (e.g., a list of the workstations 104 with their corresponding statuses).

The command center UI 700 also includes a control panels field 708 including links to various control panels for the system 100. For example, the control panels field 708 of FIG. 7 includes an office control panel option configured to, when selected by the user, present a control panel for the office selected. Also, the control panels field 708 includes a floor control panel option configured to, when selected by the user, present a control panel for the floor selected.

Further, the control panels field 708 includes a zone control panel configured to, when selected by the user, present a control panel for the zone selected. Accordingly, the control panels field 708 provides the user with control over workstations 104 on an office level, a floor level, or a zone level.

Figure 8:
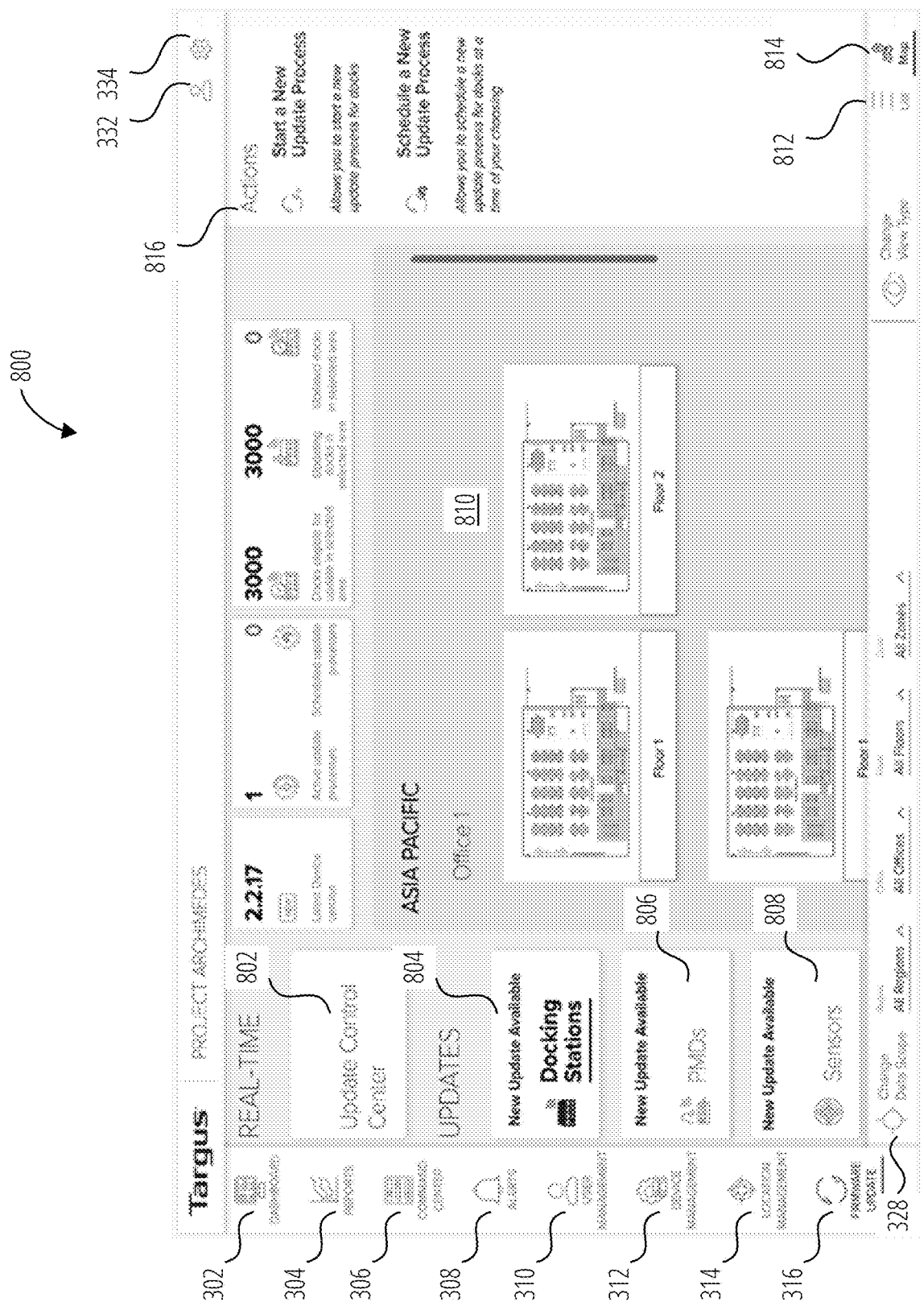
FIG. 8 is an example view of a firmware update UI, according to some embodiments.

FIG. 8 is an example view of the firmware update UI 800, according to some embodiments. The firmware update UI 800 is configured to enable a user to perform remote updates to firmware of the docking station 106 of each workstations 104 of the workspace 102 (FIG. 1). The firmware update UI 800 is also configured to indicate a version of the latest device update, a number of active update processes, a number of scheduled update processes, a number of docking stations 106 that are eligible for update in a selected area (e.g., selected using the change data scope menu 328) within the workspace 102, a number of docking stations 106 in the selected area that are currently updating, and a number of docking stations 106 in the selected area that are updated.

In some embodiments, the firmware update UI 800 includes an update control center option 802 configured to, when selected by the user, update firmware and/or software of a control center (e.g., the system computer 138). In some embodiments, the firmware update UI 800 includes an update docking stations option 804 configured to, when selected by the user, update firmware and/or software operating on the docking stations 106 of the selected area. In some embodiments, the firmware update UI 800 includes an update PMDs option 806 (update Power Management Device option 806) configured to update firmware or software operating on one or more PMDs in the system 100 (FIG. 1). In some embodiments, the firmware update UI 800 includes an update sensors option 808 configured to update firmware and/or software of the sensors 128 (FIG. 1) and/or the IoT sensor packs 210 (FIG. 2) in the selected area. While not shown, the firmware update UI 800 may also include an update peripheral devices option configured to update firmware and/or software of peripheral devices. In some embodiments, the firmware update UI 800 includes a selected workstations field 810 configured to indicate the workstations 104 that have been selected. A list view option 812 and a map view option 814 enable the user to select between a list view and a map view, respectively, of the selected workstations field 810. The selected workstations field 810 shown in FIG. 8 is in the map view mode, and therefore shows maps of the workstations 104 in all regions, all offices, all floors, and all zones.

In some embodiments, the firmware update UI 800 includes an actions field 816 configured to enable a user to quickly and easily start a new update process for docking stations and schedule a new update process for docking stations at a time of the user's choosing.

Figure 9:
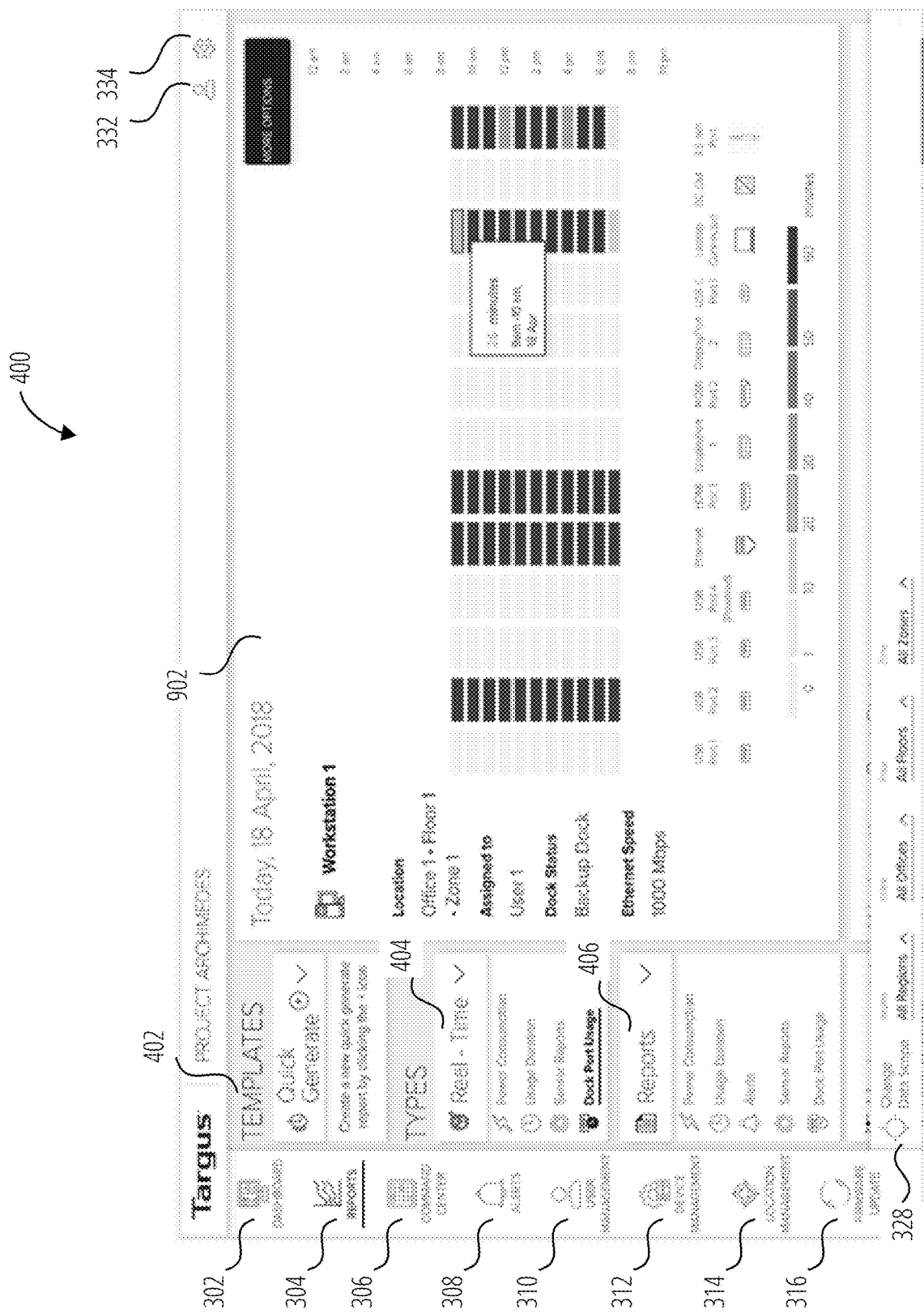
FIG. 9 is an example view of a reports UI, according to some embodiments.

FIG. 9 is an example view of the reports UI 400, according to some embodiments. The reports UI 400 of FIG. 9 illustrates a dock port usage field 902 displayed responsive to selections of the dock port report option of the types field 404 and the Quick Generate option of the templates field 402. The dock port usage field 902 is configured to indicate an amount of time per hour that each of the peripheral device ports 110 of the docking station 106 of a selected one of the workstations 104 (FIG. 1) has been used. By way of non-limiting example, the docking station 106 of the selected workstation 104 includes USB Port 1, USB Port 2, USB Port 3, USB Port 4 (Powered), Ethernet, HDMI Port 1, DisplayPort 1, HDMI Port 2, DisplayPort 2, USB C Port 1, Laptop Connected, and DC Out, 3.5 mm Port. In the dock port usage field 902 of FIG. 9, the amount of time during each hour of the day that these ports were in use is indicated using a color coding scheme to indicate either 0, 1, 10, 20, 30, 40, 50, or 60 minutes of use during each hour of the day.

The dock port usage field 902 is also configured to indicate a location (e.g., office 1, floor 1, zone 1) a user of the selected workstation 104 is assigned to (e.g., user 1), a docking station status (e.g., backup dock), and an Ethernet speed (e.g., 1,000 megabits per second (Mbps)) of the selected workstation 104 (e.g., workstation 1).

FIG. 10 is an example view of the reports UI 400, according to some embodiments. The reports UI 400 of FIG. 10 illustrates a sensor reading field 1002 and a workstation sensor status field 1004 displayed responsive to selections of the sensor reports option of the types field 404 and the Quick Generate option of the templates field 402. The sensor reading field 1002 is configured to enable the user to view information regarding sensor readings taken at the workstations 104 of FIG. 1 (e.g., taken by the sensor 128 (FIG. 1) and/or the IoT sensor pack 210 (FIG. 2)). By way of non-limiting example, the sensor reading field 1002 may be selectively configured to display temperature readings, humidity readings, occupancy readings, battery state of charge readings of a sensor battery (e.g., a battery for the sensor 128 and/or the IoT sensor pack 210), and plots of each over time, for a selected workstation 104.

The workstation sensor status field 1004 is configured to indicate statuses of sensors at a list of selected workstations (e.g., selected using the change data scope menu 328). By way of non-limiting example, the workstation sensor status field 1004 may be configured to list temperature, humidity, occupancy, sensor battery state of charge, an office, floor, and zone of each workstation 104, and a user assigned to each workstation 104.

FIG. 11 is an example view of the user management UI 1100, according to some embodiments. The user management UI 1100 is configured to enable management of users within a selected area (e.g., selected using the change data scope menu 328) within the workspace 102 of FIG. 1. The user management UI 1100 is configured to indicate a number of active users in the selected area, a number of inactive users (e.g., former users who have been removed from the system 100), a number of the active users that are administrators, a number of the active users that are managers, a number of the active users that are end users, a number of the active users that have been assigned NFC cards (e.g., to interact with NFC sensors at the workstations 104 and at entrances of offices, conference rooms, other facilities, etc.), a number of the active users without NFC cards, a number of the active users having assigned workstations 104, and a number of the active users without assigned workstations 104.

The user management UI 1100 includes a user listing field 1102 and an actions field 1104. The user listing field 1102 is configured to display a list including display names, user names, designations, roles (e.g., end user, manager, IT professional, etc.), workstation 104 status (e.g., identification, location, assigned/not assigned status, and reserved/not reserved status of a workstation 104), and NFC card assignment status (e.g., "yes" for NFC card assigned and "no" for NFC card not assigned) for each of the users in the selected area. The user listing field 1102 also includes a search field to enable a search for a particular user. The list displayed in the user listing field 1102 may be sortable by display name, user name, designation, role, workstation status, and NFC card assignment status.

The actions field 1104 includes links to interfaces for performing operations related to user management. By way of non-limiting example, the actions field 1104 includes a "create a new user" link configured to navigate to a UI that enables creation of a new user in the system 100 who can use the system 100. Also by way of non-limiting example, the actions field 1104 includes a "create multiple new users" link configured to navigate to a UI that enables creation of multiple new users through the use of a Comma Separated Values (CSV) file. As another non-limiting example, the actions field 1104 includes an "edit user" link configured to navigate to a UI that enables edits to be made to details of an existing user. As a further non-limiting example, the actions field 1104 includes a "deactivate user" link that navigates to a UI that enables deactivation on one or more of the existing users. As another non-limiting example, the actions field 1104 includes a "link NFC card to user" link that navigates to a UI that enables an NFC card to be assigned to a particular user.

FIG. 12 is an example view of the alerts UI 1200, according to some embodiments. The alerts UI 1200 is configured to enable a user to view and take actions on alerts affecting the system 100 of FIG. 1. The alerts may include critical alerts (e.g., alerts regarding communication connectivity loss, internal temperature of the workspace 102, escalated alerts, etc.), warnings (e.g., battery level (of a sensor battery), power consumption, usage duration, unauthorized access, ambient sensor threshold warnings, etc.), and notifications (e.g., new update notifications, override event notifications, etc.). The alerts UI 1200 includes an alerts display field 1214 configured to display alerts for a selected area (e.g., selected using the change data scope menu 328).

The alerts displayed in the alerts display field 1214 may be displayed in a map view responsive to a user selection of a map view option 1208 (as illustrated in FIG. 12) or in a list view responsive to a user selection of a list view option 1210 (as illustrated in FIG. 13). In the map view, the alerts display field 1214 may be configured to display alert links 1212 at locations within the workspace 102 where issues associated with the alerts are located. These alert links 1212, if selected by a user, may navigate to UIs designed to enable the user to take action on the specific issues associated with the alerts or escalate the alerts (e.g., to critical alerts).

The alerts displayed in the alerts display field 1214 may be narrowed by user selections of options within a critical alerts field 1202, a warnings field 1204, and a notifications field 1206. The critical alerts field 1202 includes a connectivity loss option, an internal temperature option, and an escalated alerts field. A user selection of any of these options in the critical alerts field 1202 will cause the alerts display field 1214 to only display a corresponding subset of all the alerts of the selected area. For example, a user selection of the connectivity loss option within the critical alerts field 1202 would cause the alerts display field 1214 to display only those of the alerts that concern communication connectivity loss (e.g., network outages, etc.). Also by way of non-limiting example, a user selection of the internal temperature option within the critical alerts field 1202 would cause the alerts display field 1214 to display only those of the alerts that concern internal temperature. In the example of FIG. 12, none of the options in the critical alerts field 1202, warnings field 1204, or notifications field 1206 have been selected so the alerts display field 1214 is displaying all alerts in the selected area.

The warnings field 1204 includes a battery levels option, a power consumption option, a usage duration option, an unauthorized access option, and an ambient sensor threshold option. User selections of these options of the warnings field 1204 would cause the alerts display field 1214 to display only those of the alerts that concern battery levels (e.g., of the sensor 128, IoT sensor pack 210, etc.), power consumption, usage duration, unauthorized access, and ambient sensor threshold, respectively. The notifications field 1206 includes a new updates available option and an override events option. User selections of these options of the notifications field 1206 would cause the alerts display field 1214 to display only those of the alerts that concern new updates that are available and override events, respectively.

FIG. 13 is an example view of the alerts UI 1200, according to some embodiments. In the example of FIG. 13, the critical alerts option of the critical alerts field 1202 has been selected, so the alerts display field 1214 is displaying only those of the alerts in the selected area that are categorized as critical alerts. Also, in the example of FIG. 13, the list view option 1210 has been selected, so the alerts in the alerts display field 1214 are displayed in a list view. The list view includes, for each displayed alert, an alert description, a time of the alert, an office where the alert occurred, a floor within the office where the alert occurred, a zone within the floor where the alert occurred, and a zone within the floor where the alert occurred. The list view also includes an escalate option 1302 and an alert link 1212 for each of the alerts. The escalate option 1302 is configured to escalate the corresponding alert to a critical alert if selected by the user. The alert link 1212 is configured to navigate to a UI for taking action for the issue of the corresponding alert.

It will be apparent to those of ordinary skill in the art that various modifications may be made to the disclosed embodiments without departing from the scope of the disclosure. The scope of the protected invention should, therefore, be determined only based on the following claims.

What is claimed is:

1. A system to manage a workspace, comprising:
a plurality of docking stations located at corresponding workstations, each docking station to provide a network connection and power to a computer device at a corresponding workstation, each docking station of the plurality of docking stations including:
a power input,
a network interface to communicate with a network,
one or more peripheral devices, and
one or more sensor devices; and
a system computer including a system network interface to communicate with each docking station of the plurality of docking stations via the network, the system computer being configured to:
receive sensor data from at least one of the plurality of docking stations;
analyze power consumption data of the one or more peripheral devices to determine an amount of power consumed by each of the one or more peripheral devices when in a state of non-use;
determine whether power currently being consumed by each of the one or more peripheral devices is consistent with the amount of power consumed by each of the one or more peripheral devices when in the state of non-use; and
modify an output or an input of at least one of the one or more peripheral devices in response to receiving the sensor data and based on the power consumption data indicating the state of non-use.

2. The system of claim 1, wherein the received sensor data is generated by an ambient light sensor and the at least one peripheral device comprises a smart light.

3. The system of claim 2, wherein the system computer is configured to modify a level of brightness of the smart light in response to received ambient light sensor data.

4. The system of claim 1, wherein the received sensor data is generated by a sensor for monitoring user occupancy at the corresponding workstation and generating sensor data relating to the user occupancy.

5. The system of claim 4, wherein the sensor comprises an ambient light sensor.

6. The system of claim 5, wherein the system computer is configured to determine the occupancy of at least one of the plurality of corresponding workstations based on data generated by the ambient light sensor.

7. The system of claim 6, wherein the system computer is further configured to generate an availability notice associated with the at least one corresponding workstation based on a determination that the at least one corresponding workstation is currently unoccupied.

8. The system of claim 6, wherein the system computer is further configured to block at least one of the one or more peripheral devices from drawing power based on a determination that the at least one corresponding workstation is currently unoccupied.

9. The system of claim 1, wherein the system computer is further configured to:
receive a location identifier associated with each docking station;
receive sensor data from each docking station; and
generate usage data identifying usage of each corresponding workstation, the usage data based on the received location identifier and the received sensor data from each docking station.

10. A system to manage a workspace, comprising:
a plurality of docking stations located at corresponding workstations, each docking station to provide a network connection and power to a computer device at a corresponding workstation, each docking station of the plurality of docking stations including:
a power input,
a network interface to communicate with a network,
one or more peripheral devices, and
one or more sensor devices; and
a system computer including a system network interface to communicate with each docking station of the plurality of docking stations via the network and a database of historical sensor data generated by at least one of the one or more sensor devices, wherein the system computer is configured to:
analyze historical sensor data from the database of historical sensor data;
analyze power consumption data of the one or more peripheral devices to determine an amount of power consumed by each of the one or more peripheral devices when in a state of non-use;
determine whether power currently being consumed by each of the one or more peripheral devices is consistent with the amount of power consumed by each of the one or more peripheral devices when in the state of non-use; and
based on the power consumption data indicating the state of non-use and the historical sensor data, modify an output of at least one of the one or more peripheral devices of at least one of the plurality of docking stations to conserve power.

11. The system of claim 10, wherein analyzing the historical sensor database comprises determining that the corresponding workstation of one of the plurality of docking stations is likely to be unoccupied for a particular period of time based on the historical sensor data.

12. The system of claim 11, wherein modifying the output of the at least one peripheral device comprises blocking the at least one peripheral device from drawing power during the particular period of time.

13. The system of claim 11, wherein the system computer is further configured to generate an availability notice associated with the corresponding workstation and the particular period of time.

14. The system of claim 10, wherein each of the plurality of docking stations further includes a location identifier that is configured to identify the location of the docking station, the corresponding workstation, the one or more peripheral devices, and the one or more sensor devices.

15. The system of claim 14, wherein analyzing the historical sensor data further comprises analyzing the location of the at least one docking station.

16. The system of claim 10, wherein each of the plurality of docking stations, each of the one or more peripheral devices, and each of the one or more sensors include a location identifier that is configured to identify the location of each docking station, each sensor, and each peripheral device.

* * * * *